(12) United States Patent
Okamoto et al.

(10) Patent No.: US 11,078,636 B2
(45) Date of Patent: Aug. 3, 2021

(54) DISPLAY DEVICE, DISPLAY METHOD, RECORDING MEDIUM, AND STRUCTURE MONITORING SYSTEM

(71) Applicant: Seiko Epson Corporation, Tokyo (JP)

(72) Inventors: Hiroshi Okamoto, Shiojiri (JP);
Kazuyoshi Takeda, Chino (JP);
Makoto Sakurai, Okaya (JP);
Hidehiko Sekiya, Kawasaki (JP);
Chitoshi Miki, Kawasaki (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/437,052

(22) Filed: Jun. 11, 2019

(65) Prior Publication Data

US 2019/0376243 A1 Dec. 12, 2019

(30) Foreign Application Priority Data

Jun. 12, 2018 (JP) .............................. JP2018-111703

(51) Int. Cl.
*E01D 15/127* (2006.01)
*G01P 15/03* (2006.01)
(Continued)

(52) U.S. Cl.
CPC .......... *E01D 15/127* (2013.01); *G01P 15/032* (2013.01); *G01P 15/0891* (2013.01); *G06K 9/4642* (2013.01)

(58) Field of Classification Search
CPC .. E01D 15/127; G01P 15/0891; G01P 15/032; G01P 15/00; G01P 1/127; G01P 3/02; G01P 3/64; G06K 9/4642; G06K 9/00335; G06K 9/00771; G06K 9/00791; G06K 9/00805; G06K 9/52; G06K 9/522; G06K 9/6292; G01M 5/0008; G01M 11/081; G01M 5/0041; G01M 5/0066; G01M 5/0033; G01M 5/0058; G01M 5/0091; G01M 7/025; G01M 99/002; G01B 11/16; G01B 5/04; G01B 7/16; G01G 19/022; G01G 19/035; G01G 23/01;

(Continued)

(56) References Cited

U.S. PATENT DOCUMENTS 6,292,108 B1 * 9/2001 Straser .................. G01B 21/32
340/539.1
7,647,206 B2 * 1/2010 Ford .................. G01N 29/4409
702/183

(Continued)

FOREIGN PATENT DOCUMENTS

JP 2017-003556 A 1/2017
JP 2017-058177 A 3/2017
(Continued)

*Primary Examiner* — Nimeshkumar D Patel
*Assistant Examiner* — Gedeon M Kidanu
(74) *Attorney, Agent, or Firm* — Harness, Dickey & Pierce, P.L.C.

(57) ABSTRACT

A display device displays displacement of a bridge serving as a structure on a display part in the form of image information that is visually recognizable, based on a displacement amount of the bridge, the displacement amount having been calculated based on an output signal output from an acceleration detector serving as a physical quantity sensor provided on the bridge.

12 Claims, 27 Drawing Sheets

(51) Int. Cl.
   *G01P 15/08*   (2006.01)
   *G06K 9/46*    (2006.01)

(58) Field of Classification Search
   CPC ............ G01G 9/00; G06T 2207/10016; G06T
                  2207/20056; G06T 2200/24; G06T
                  2207/10004; G06T 2207/10048; G06T
                  2207/20216; G06T 2207/30004; G06T
                  2207/30132; G06T 2207/30164; G06T
                  2207/30236; G06T 7/0004; G06T 7/0016;
                  G06T 7/11; G06T 7/20; G06T 7/246;
                  G06T 7/248; G06T 7/262; G06T 7/60;
                  G06T 7/70; G06T 7/73; G01H 13/00;
                  G01H 1/06; G01L 1/248; H04N 5/33;
                  H04N 7/18
   See application file for complete search history.

(56) References Cited

U.S. PATENT DOCUMENTS

| | | | |
|---|---|---|---|
| 10,712,924 B2 * | 7/2020 | Hay | A61B 5/01 |
| 2010/0242609 A1 * | 9/2010 | Lee | G01M 5/0008 |
| | | | 73/594 |
| 2012/0204646 A1 * | 8/2012 | Lee | G01M 7/00 |
| | | | 73/594 |
| 2014/0316708 A1 * | 10/2014 | Mollineaux | G01C 21/16 |
| | | | 702/15 |
| 2015/0134545 A1 * | 5/2015 | Mann | G06F 30/13 |
| | | | 705/305 |
| 2015/0142322 A1 * | 5/2015 | Okamoto | G01V 1/008 |
| | | | 702/15 |
| 2016/0036544 A1 * | 2/2016 | Katayama | G01D 18/00 |
| | | | 702/89 |
| 2016/0036916 A1 * | 2/2016 | Takeda | H04L 67/12 |
| | | | 702/89 |
| 2016/0171309 A1 * | 6/2016 | Hay | A61B 5/024 |
| | | | 348/143 |
| 2016/0238438 A1 * | 8/2016 | Chen | G01M 5/0033 |
| 2017/0097277 A1 | 4/2017 | Kobayashi | |
| 2017/0097278 A1 | 4/2017 | Kobayashi | |
| 2017/0098127 A1 * | 4/2017 | Kobayashi | G06K 9/6292 |
| 2017/0160165 A1 * | 6/2017 | Moon | G01M 5/0075 |
| 2017/0184550 A1 * | 6/2017 | Kobayashi | G01M 5/0066 |
| 2017/0243366 A1 * | 8/2017 | Imagawa | G06T 7/70 |
| 2017/0284892 A1 * | 10/2017 | Takeda | G01M 5/0008 |
| 2018/0052117 A1 * | 2/2018 | Imai | G01M 5/0075 |
| 2018/0209883 A1 * | 7/2018 | Imagawa | G01M 5/0058 |
| 2018/0275659 A1 * | 9/2018 | Ono | B64C 39/024 |
| 2018/0348064 A1 * | 12/2018 | Irie | G01M 11/081 |
| 2019/0212223 A1 * | 7/2019 | Kusaka | G01M 5/0008 |

FOREIGN PATENT DOCUMENTS

| | | |
|---|---|---|
| JP | 2017-067721 A | 4/2017 |
| JP | 2017-067722 A | 4/2017 |
| JP | 2017-067723 A | 4/2017 |
| JP | 2017-068781 A | 4/2017 |
| JP | 2017-217980 A | 12/2017 |
| JP | 2018-017533 A | 2/2018 |
| JP | 2018-066637 A | 4/2018 |

* cited by examiner

DISPLAY DEVICE, DISPLAY METHOD, RECORDING MEDIUM, AND STRUCTURE MONITORING SYSTEM

Japanese Patent Application No. 2018-111703, filed on Jun. 12, 2018, is hereby incorporated by reference in its entirety.

BACKGROUND

1. Technical Field

The present invention relates to a display device, a display method, a recording medium, and a structure monitoring system.

2. Related Art

A well-known, conventional system measures the state of a man-made structure such as a building, a bridge, or a slope, or a natural structure such as a natural slope, using various sensors in order to monitor the structure and detect abnormalities therein.

For example, JP-A-2017-217980 proposes a management method for providing information relating to an abnormality occurring in a structure such as a road, a bridge, or a railroad. According to this management method, a plurality of individual monitoring devices for photographing the structure are disposed continuously at predetermined intervals, an abnormality in the structure is detected by comparing images captured by the individual monitoring devices with reference images, and notification of the abnormality is issued.

With the management method described in JP-A-2017-217980, however, a problem exists in that although it is possible to determine the presence of an abnormality on a bridge, it is not possible to provide information relating to a degree of displacement of the bridge.

SUMMARY

According to a first aspect of the invention, there is provided a display device that displays displacement of a bridge over which a vehicle travels on a display part in the form of image information that is visually recognizable, based on a displacement amount of the bridge, the displacement amount having been calculated based on time-synchronized output signals output respectively from a plurality of acceleration detectors provided on the bridge.

According to a second aspect of the invention, there is provided a display method including:

calculating a displacement amount of a bridge over which a vehicle travels based on time-synchronized output signals output respectively from a plurality of acceleration detectors provided on the bridge;

generating image information that enables to visually recognize the displacement of the bridge, based on the calculated displacement amount of the bridge; and displaying the generated image information.

According to a third aspect of the invention, there is provided a nonvolatile computer recording medium storing a program that causes a computer to execute:

calculating a displacement amount of a bridge over which a vehicle travels based on time-synchronized output signals output respectively from a plurality of acceleration detectors provided on the bridge;

generating image information that enables to visually recognize the displacement of the bridge, based on the calculated displacement amount of the bridge; and displaying the generated image information.

According to a fourth aspect of the invention, there is provided a structure monitoring system including:

a plurality of acceleration detectors provided on a bridge over which a vehicle travels;

a calculator that calculates a displacement amount of the bridge based on time-synchronized output signals output respectively from the plurality of acceleration detectors;

a generator that generates image information that enables to visually recognize the displacement of the bridge, based on the calculated displacement amount of the bridge; and the above-described display device that displays the generated image information.

DETAILED DESCRIPTION OF THE EMBODIMENT

Figure 1:
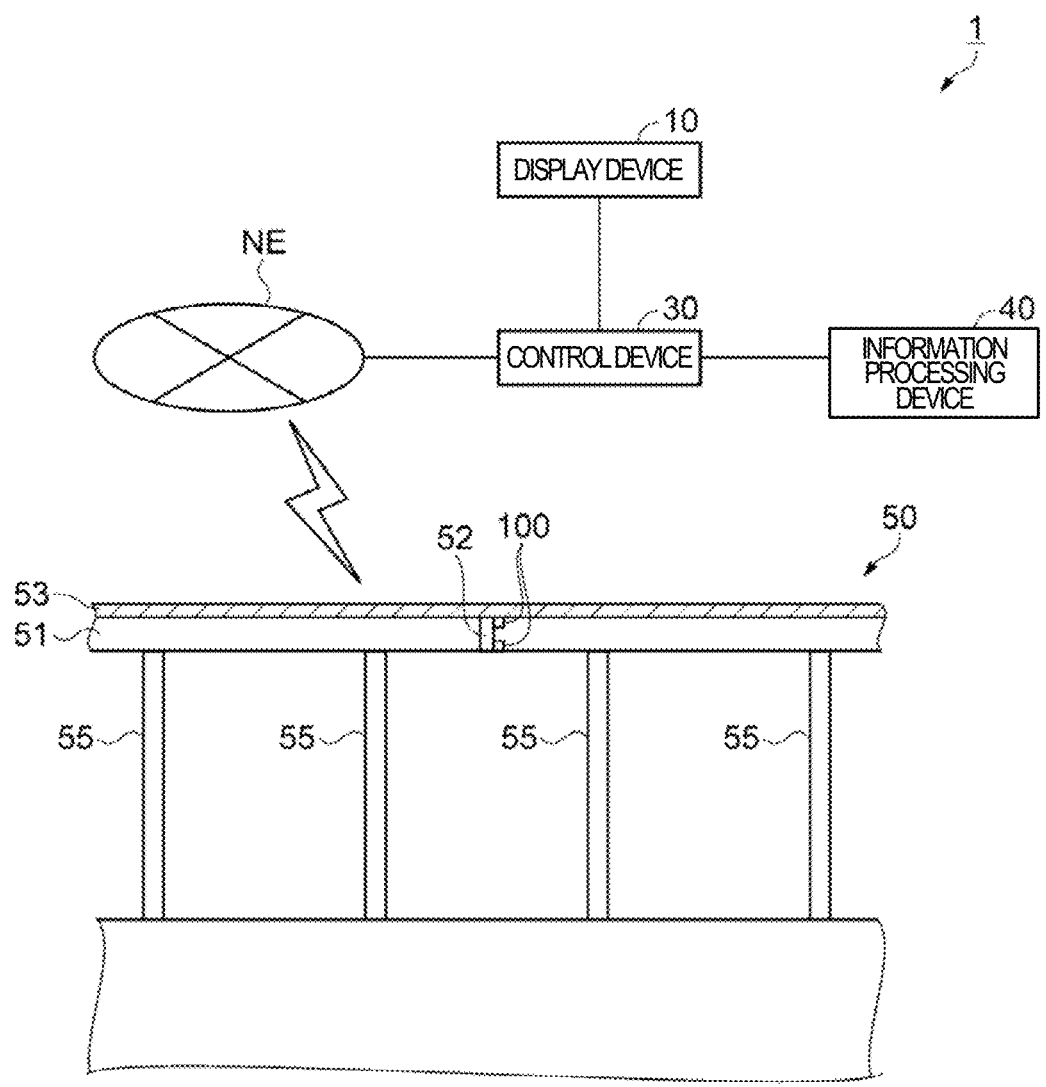
FIG. 1 is a schematic view illustrating a configuration of a structure monitoring system according to a first embodiment.

According to an embodiment of the invention, there is provided a display device that displays displacement of a bridge over which a vehicle travels on a display part in the form of image information that is visually recognizable, based on a displacement amount of the bridge, the displacement amount having been calculated based on time-synchronized output signals output respectively from a plurality of acceleration detectors provided on the bridge.

In the display device described above, the image information may be changed based on change in the displacement amount, and the changed image information may be displayed by using at least one of color, shading, lines, dots, circles, numerical values, symbols, loci, graphs, histograms, and waveforms.

In the display device described above, the displacement amount of the bridge may be a relative value of the displacement amount calculated based on the output signals.

In the display device described above, a model image relating to the bridge may be displayed, and the image information may be displayed either so as to be superimposed on the model image or side by side with the model image.

In the display device described above, the image information may be a line display image including a plurality of line segments linking adjacent acceleration detectors among the plurality of acceleration detectors.

In the display device described above, a display angle of the line display image may be changed by operating a first tag provided on the display part.

The display device described above may include a memory, and the output signals may be recorded in the memory.

In the display device described above, the image information corresponding to a selected time may be displayed by operating a second tag displayed on the display part and used to select a time.

In the display device described above, information about overload may be displayed on the display part after determining that a preset overload reference value has been exceeded based on the weight of the vehicle, the weight of the vehicle having been measured by a weight measurement device provided on the bridge.

According to an embodiment of the invention, there is provided a display method including:

calculating a displacement amount of a bridge over which a vehicle travels based on time-synchronized output signals output respectively from a plurality of acceleration detectors provided on the bridge;

generating image information that enables to visually recognize the displacement of the bridge, based on the calculated displacement amount of the bridge; and displaying the generated image information.

In the step of generating image information in the display method described above, image information that is changed based on change in the displacement amount may be generated by using at least one of color, shading, lines, dots, circles, numerical values, symbols, loci, graphs, histograms, and waveforms.

According to an embodiment of the invention, there is provided a program that causes a computer to execute:

calculating a displacement amount of a bridge over which a vehicle travels based on time-synchronized output signals output respectively from a plurality of acceleration detectors provided on the bridge;

generating image information that enables to visually recognize the displacement of the bridge, based on the calculated displacement amount of the bridge; and displaying the generated image information.

According to an embodiment of the invention, there is provided a nonvolatile computer recording medium storing a program that causes a computer to execute:

calculating a displacement amount of a bridge over which a vehicle travels based on time-synchronized output signals output respectively from a plurality of acceleration detectors provided on the bridge;

generating image information that enables to visually recognize the displacement of the bridge, based on the calculated displacement amount of the bridge; and displaying the generated image information.

According to an embodiment of the invention, there is provided a structure monitoring system including:

a plurality of acceleration detectors provided on a bridge over which a vehicle travels;

a calculator that calculates a displacement amount of the bridge based on time-synchronized output signals output respectively from the plurality of acceleration detectors;

a generator that generates image information that enables to visually recognize the displacement of the bridge, based on the calculated displacement amount of the bridge; and the above-described display devices that displays the generated image information.

According to an embodiment of the invention, there is provided a structure monitoring system including:

a plurality of acceleration detectors provided on a bridge over which a vehicle travels; and a display device that displays displacement of the bridge in the form of image information that is visually recognizable, based on a displacement amount of the bridge, the displacement amount having been calculated based on time-synchronized output signals output respectively from the plurality of acceleration detectors, wherein the display device includes:

a receiver that receives the output signals;

a calculator that calculates the displacement amount of the bridge based on the received output signals;

a generator that generates image information that enables to visually recognize the displacement of the bridge, based on the calculated displacement amount of the bridge; and a display part that displays the generated image information.

Preferred embodiments of the display device, display method, program, recording medium, and structure monitoring system according to the invention will be described below with reference to the attached drawings. Note that the following embodiments do not unduly limit the scope of the invention as stated in the claims. In addition, all of the elements described in connection with the following embodiments should not necessarily be taken as essential requirements of the invention.

1. First Embodiment

1.1. Structure Monitoring System

Figure 2:
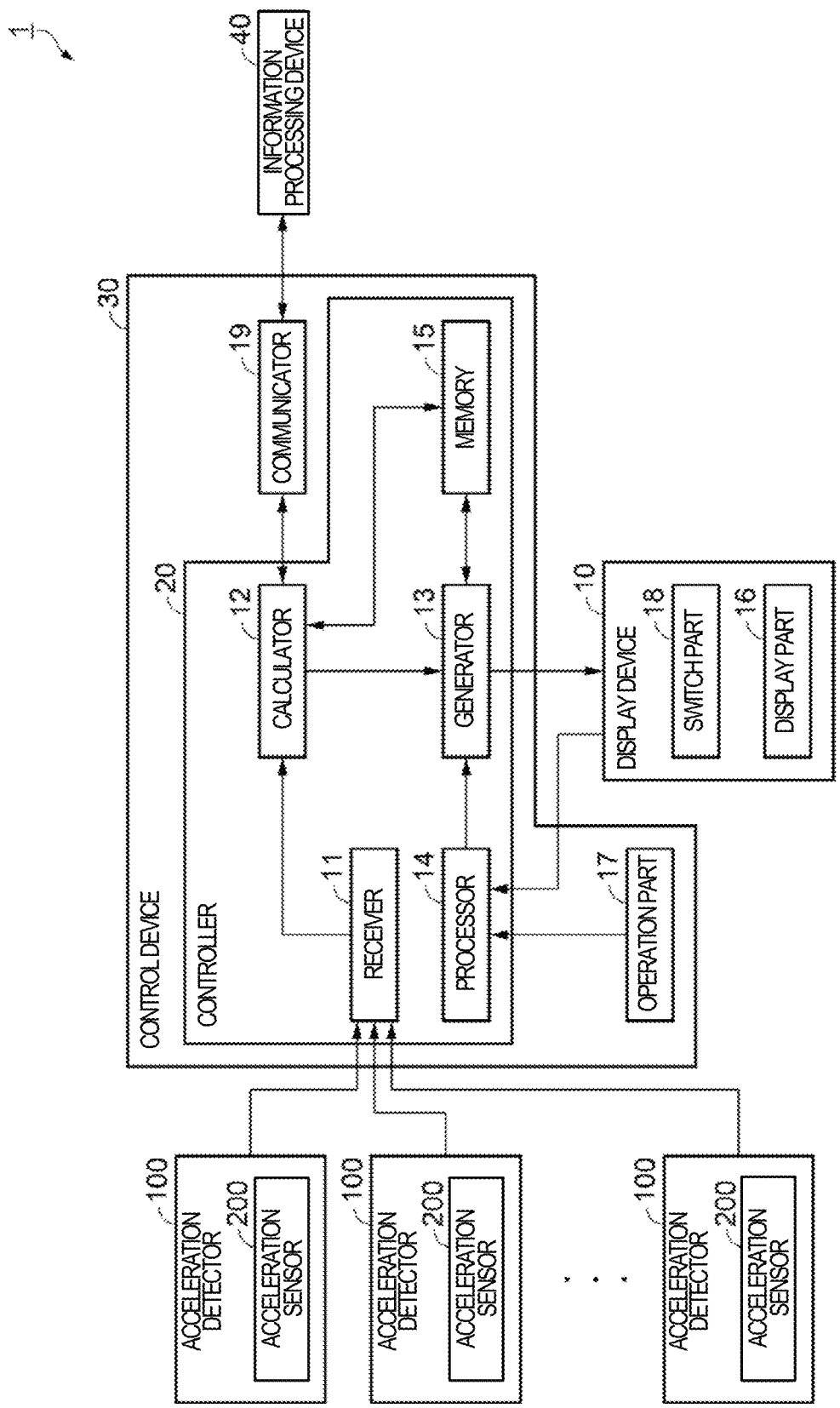
FIG. 2 is a function block diagram illustrating the configuration of the structure monitoring system according to the first embodiment.
Figure 3A:
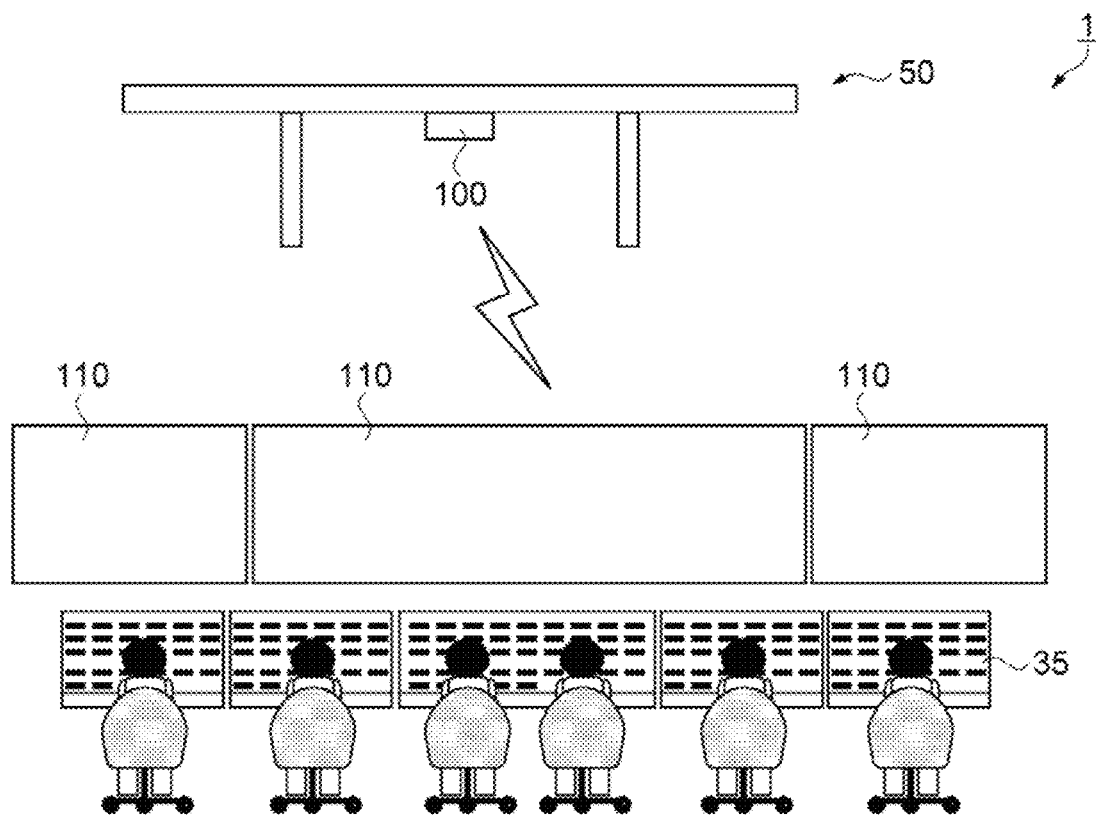
FIG. 3A is a schematic view illustrating a configuration of a specific example of a display device.
Figure 3B:
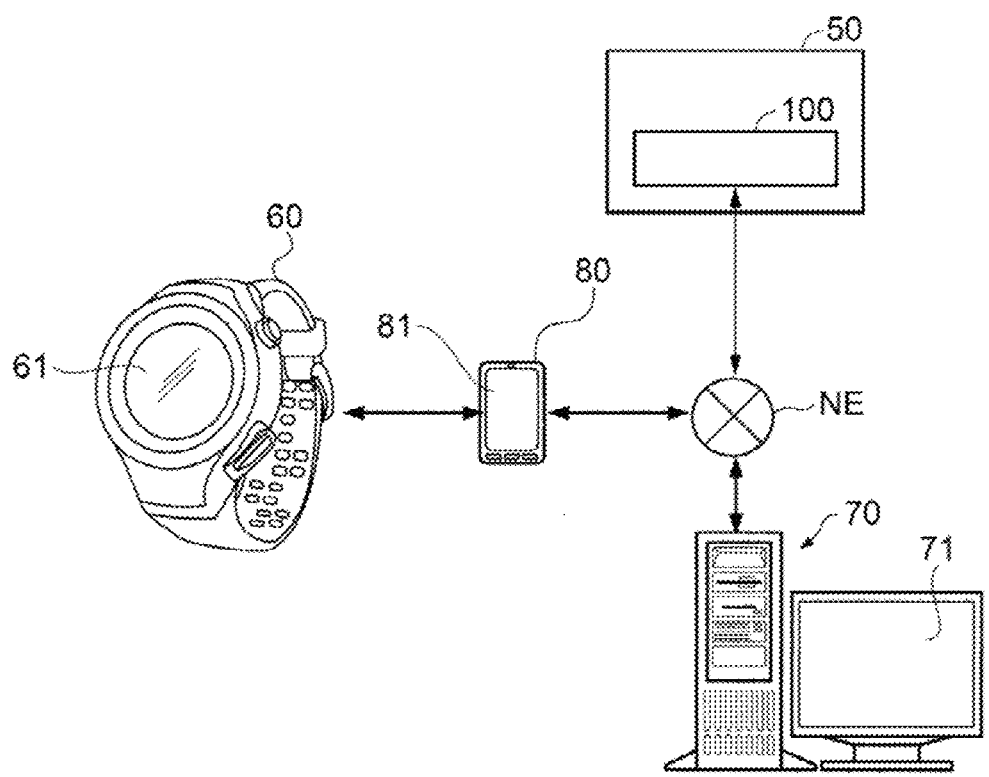
FIG. 3B illustrates examples of other display devices.

First, a structure monitoring system 1 according to a first embodiment of the invention will be described with reference to FIGS. 1, 2, 3A, and 3B. FIG. 1 is a schematic view illustrating a configuration of the structure monitoring system according to the first embodiment. FIG. 2 is a function block diagram illustrating the configuration of the structure monitoring system according to the first embodiment. FIG. 3A is a schematic view illustrating a configuration of a specific example of a display device. FIG. 3B illustrates examples of other display devices.

The structure monitoring system 1 according to the first embodiment, illustrated in FIGS. 1 and 2, has a function for monitoring the state of a structure such as a bridge 50 or a building (not shown) by displaying the state of displacement of the structure on a display device 10 in the form of image information based on displacement information about the structure, the displacement information being detected by acceleration detectors 100 that serve as physical quantity sensors and are disposed on the structure. Note that in the first embodiment, an example in which the state of the bridge 50 is monitored as the structure will be described.

As illustrated in FIGS. 1 and 2, the structure monitoring system 1 is configured to include the acceleration detectors 100, which are constituted by a plurality of physical quantity sensors disposed on the bridge 50 that serves as an example of the structure, and the display device 10, which displays image information from which displacement of the bridge 50 can be visually recognized based on a displacement amount of a main girder 51 of the bridge 50, which is calculated by a control device 30 based on output signals output respectively from the plurality of acceleration detectors 100. Note that the plurality of acceleration detectors 100 are disposed on either the main girder 51 or a crossbeam 52 located between one pier 55 and another pier 55 of the bridge 50. Furthermore, in this embodiment, an example in which eight acceleration detectors 100 (see FIG. 6) are disposed will be described, but the number of acceleration detectors 100 is not limited.

The acceleration detectors 100 serving as the physical quantity sensors are capable of detecting acceleration in respective axial directions of three mutually orthogonal axes. The acceleration detectors 100 are fixed to predetermined positions on the bridge 50 so that output signals from the respective acceleration detectors 100 can be output to the control device 30. Note that the configuration of the acceleration detector 100 will be described in detail below.

1.2. Control Device

The control device 30 includes a controller 20 that calculates the displacement amount of the main girder 51 of the bridge 50 based on the output signals output from the plurality of acceleration detectors 100 and outputs the calculated displacement amount in the form of visually recognizable image information, an operation part 17 that issues instructions relating to display content and so on to the controller 20, and a communicator 19 that transmits data and so on relating to the displacement amount of the main girder 51 of the bridge 50, calculated by the controller 20, to an information processing device 40 such as a server, for example.

The controller 20 includes a receiver 11, a calculator 12, a generator 13, a processor 14, and a memory 15. The respective function units of the controller 20 denote functional configurations realized by cooperation between hardware such as a CPU and a RAM, not shown in the figures, and software recorded in the memory 15, and there are no particular limitations on the specific form thereof. Accordingly, hardware corresponding individually to the respective function units does not necessarily have to be packaged in the device, and the functions of a plurality of function units may be realized by having a single processor execute a program.

The receiver 11 receives the output signals output respectively from the plurality of acceleration detectors 100, which in this embodiment are constituted by eight acceleration detectors 100, and outputs the received output signals to the calculator 12. In this case, as long as the required visually recognizable image information can be provided in accordance with the performance, precision, specifications, and so on required of the structure monitoring system 1, the receiver 11 may receive the output signal of at least one of the eight acceleration detectors 100 and output the received output signal to the calculator 12 instead of receiving all of the output signals output respectively by the eight acceleration detectors 100.

The calculator 12 calculates the displacement amount of the main girder 51 of the bridge 50 based on the output signals received by the receiver 11, and outputs the calculated displacement amount to the generator 13 and the communicator 19. Note that the calculator 12 can obtain information acquired by the information processing device 40 and so on from the communicator 19.

The generator 13 generates visually recognizable image information relating to the displacement of the bridge 50 based on the displacement amount of the main girder 51 of the bridge 50, calculated by the calculator 12, and in response to an instruction from the processor 14, outputs the generated image information to the display device 10.

The processor 14 executes various processing in accordance with a program stored in the memory 15 and various commands input by a user through the operation part 17 and a switch part 18 of the display device 10. The processor 14 controls the image information output by the generator 13 based on the existence of a screen switching instruction input from the operation part 17 or the switch part 18 of the display device 10, and issues an instruction relating to the image information to be output to the display device 10, or in other words an instruction relating to the image content to be displayed on the display device 10. The processor 14 includes a processor that operates based on a program recorded in the memory 15. The processor may be configured such that functions of respective parts thereof are realized by either individual or integrated hardware, for example. The processor may be a central processor (CPU), for example. The processor is not limited to a CPU, however, and various types of processors, such as a graphics processor (GPU) or a digital signal processor (DSP), may be used instead. The processor may also be a hardware circuit constituted by an ASIC.

A nonvolatile recording medium such as a flash memory or a hard disk is envisaged as the memory 15. For example, the memory 15 may be a semiconductor memory such as a static random-access memory (SRAM) or a dynamic random-access memory (DRAM), a register, a magnetic storage device such as a hard disk device, or an optical storage device such as an optical disk. The program used by the controller 20 to control operations of respective functions (for example, a program relating to monitoring of a structure, to be described below), the displacement amount calculated by the calculator 12, and the image information generated by the generator 13 are recorded in the memory 15.

The output signals output respectively from the acceleration detectors 100 can be recorded in the memory 15 together with a time (i.e. in time-synchronized fashion). Thus, the calculator 12 calculates the amount of displacement in the state of the bridge 50 at an earlier time than the current time based on the time-synchronized output signals recorded in the memory 15. Image information from which the displacement of the bridge 50 can be visually recognized is generated and displayed on the display device 10 in accordance with the displacement amount calculated in time series in this manner, and as a result, the user can objectively recognize and determine the state of the structure in time series.

Note that the memory 15 stores a computer-readable program that functions as a recording medium and relates to monitoring of a structure, and the functions of the respective units of the structure monitoring system 1 are realized by having the processor 14 execute this program. More specifically, a program for causing a computer to execute processing that includes procedures including calculating the displacement amount of the bridge 50 serving as the structure based on the output signals output respectively from the plurality of acceleration detectors 100 disposed on the bridge 50, generating visually recognizable image information relating to the displacement of the bridge 50 based on the displacement amount of the bridge 50, and displaying the image information is recorded in the memory 15.

The operation part 17 is constituted by buttons, keys, a microphone, a touch panel, a voice recognition function (using a microphone, not shown in the figures), an action detection function (using an acceleration sensor or the like), and so on, for example, and is capable of executing processing for converting instructions from the user into appropriate signals and transmitting the signals to the processor 14.

The communicator 19 is capable of transmitting various information output from the controller 20 to the information processing device 40 through communication and receiving various information output from the information processing device 40 through communication. The communicator 19 is configured to include a transceiver conforming to a short-range wireless communication standard such as Bluetooth (registered trademark) (including Bluetooth Low Energy (BTLE)), Wi-Fi (registered trademark) (Wi-Fi: Wireless Fidelity), Zigbee (registered trademark), near field communication (NFC), or ANT+(registered trademark), for example. Note that the communication is not limited to wireless communication, and wired communication such as CAN, CANopen, or Ethernet may be used instead.

A multifunctional portable terminal such as a personal computer or a tablet, a high-performance portable telephone such as a smartphone, or the like is envisaged as the control device 30 according to the first embodiment. A control panel 35 of a centralized management system for managing various roads, for example, such as that illustrated in FIG. 3A, may also be envisaged as the control device 30. The control device 30 presents the state of the bridge 50 to the user in the form of visual image information by receiving information such as the displacement amount of the main girder 51 of the bridge 50, output from the acceleration detectors 100, processing the information as required, and displaying the state of the bridge 50 on the display device 10. Note that the control device 30 may receive information from a plurality of acceleration detectors 100 disposed on one or each of a plurality of structures and then process and display the received plurality of information in a multifaceted manner.

Further, the processing executed by the respective units of the structure monitoring system 1 according to the first embodiment can be realized by a program recorded in the memory 15. More specifically, a method according to the first embodiment can be applied to a program that causes a computer to execute processing that includes procedures including calculating the displacement amount of the bridge 50 serving as the structure based on the output signals output respectively from the plurality of acceleration detectors 100 disposed on the bridge 50, generating image information from which the displacement of the bridge 50 can be visually recognized based on the displacement amount of the bridge 50, and displaying the image information on the display device 10.

1.3. Display Device

The display device 10 is capable of displaying the displacement amount of the main girder 51 of the bridge 50, which is calculated and generated by the control device 30 based on the output signals output respectively from the plurality of acceleration detectors 100 and then output from the control device 30, in the form of visually recognizable image information. The display device 10 includes a display part 16 for rendering images, and the switch part 18, which can be used to switch the display content. Note that a display method and display examples will be described in detail below.

The display part 16 is constituted by a liquid crystal display (LCD), an organic electroluminescence (EL) display, an electrophoretic display (EPD), a touch panel display, or the like, for example. The display part 16 displays the displacement amount of the main girder 51 of the bridge 50 in the form of a visually recognizable image based on the image information output from the generator 13 in response to an instruction from the controller 20.

The switch part 18 is constituted by an operation part 21 (operating buttons 21a to 21d) (see FIG. 8), tags on a touch panel (see FIG. 8), or the like, for example, and is capable of executing processing for converting an instruction from the user into an appropriate signal and transmitting the signal to the processor 14 of the control device 30. By operating the operation part 21 or touching the tags on the touch panel or the like, the user can perform switches so as to move a display screen on the display part 16 to the next screen or return the display screen to the previous screen, and issue display instructions such as selecting the display content.

A display panel 110 of the centralized management system for managing various roads, for example, such as that illustrated in FIG. 3A, may also be envisaged as the display device 10 according to the first embodiment. Further, a display part 81 of an information terminal 80, for example a multifunction portable terminal such as a tablet or a portable telephone such as a smartphone, a display part 61 of a portable electronic device (a wearable device) 60, a display 71 of a personal computer 70, or the like, these components being connected via a network NE, for example, as illustrated in FIG. 3B, may also be envisaged as the display device 10.

With the display device 10, image information from which the displacement of the bridge 50 serving as the structure can be visually recognized is displayed on the display part 16 based on the displacement amount of the bridge 50, which is calculated based on the output signals output respectively from the plurality of acceleration detectors 100, and therefore a manager (the user) can objectively recognize and determine the state of the bridge 50 by means of visual recognition.

1.4. Physical Quantity Sensor

Figure 4:
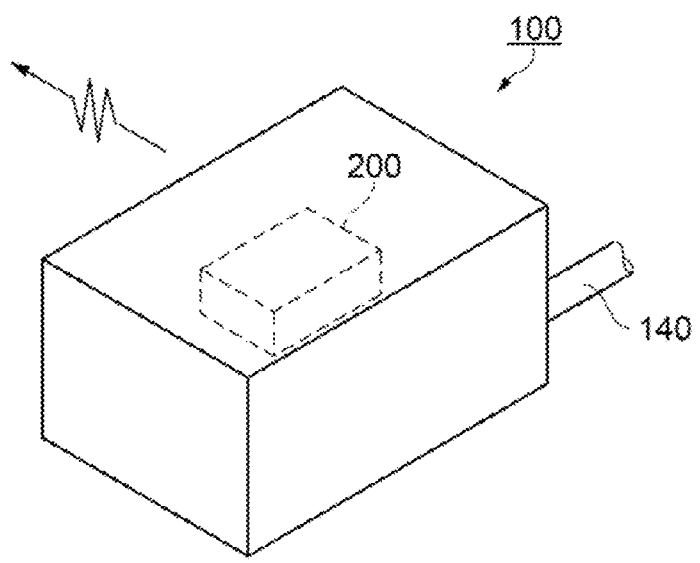
FIG. 4 is a perspective view illustrating an outer appearance of an acceleration detector.
Figure 5:
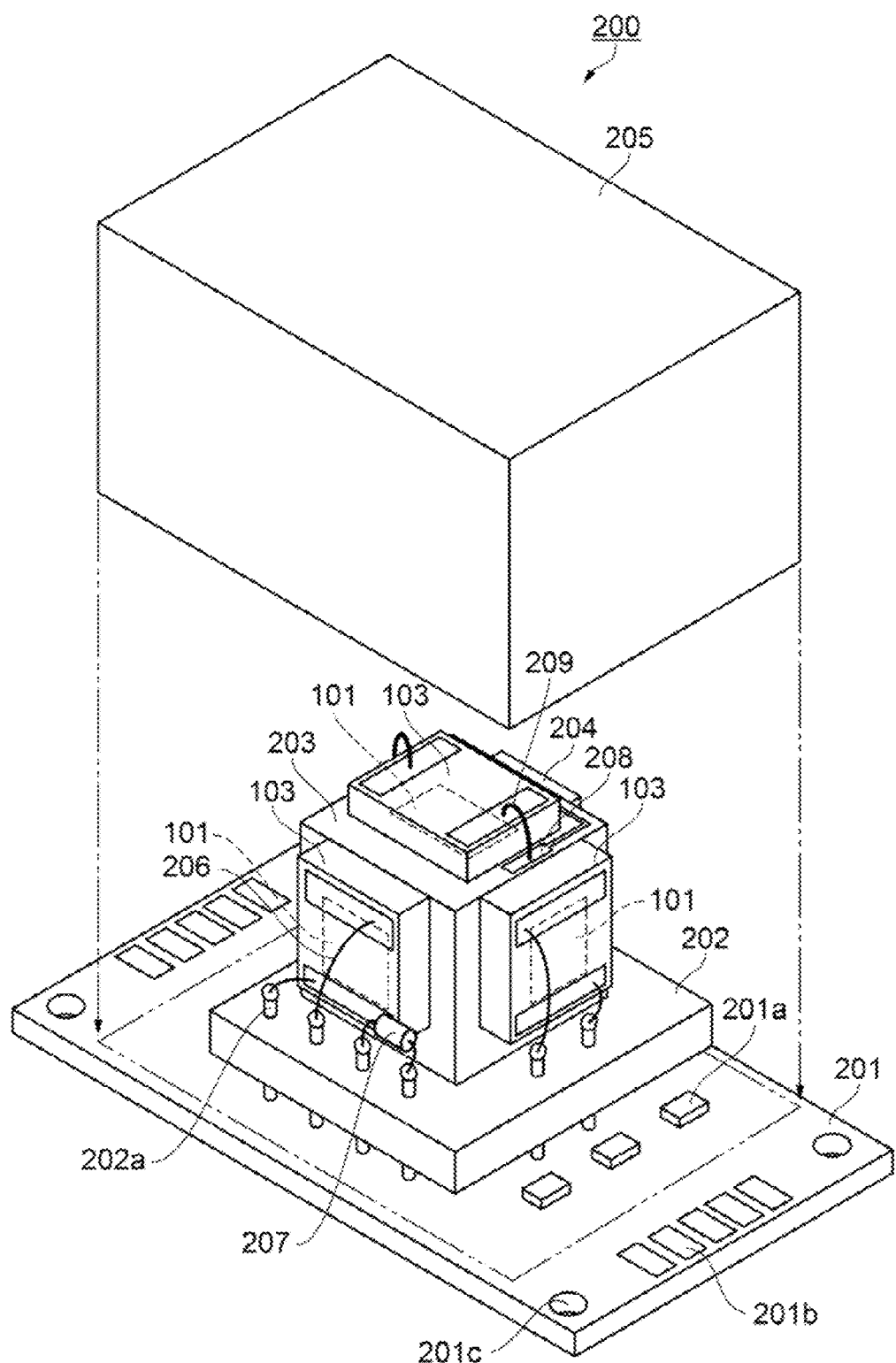
FIG. 5 is a partially-exploded perspective view schematically illustrating a configuration of an acceleration sensor.
Figure 6:
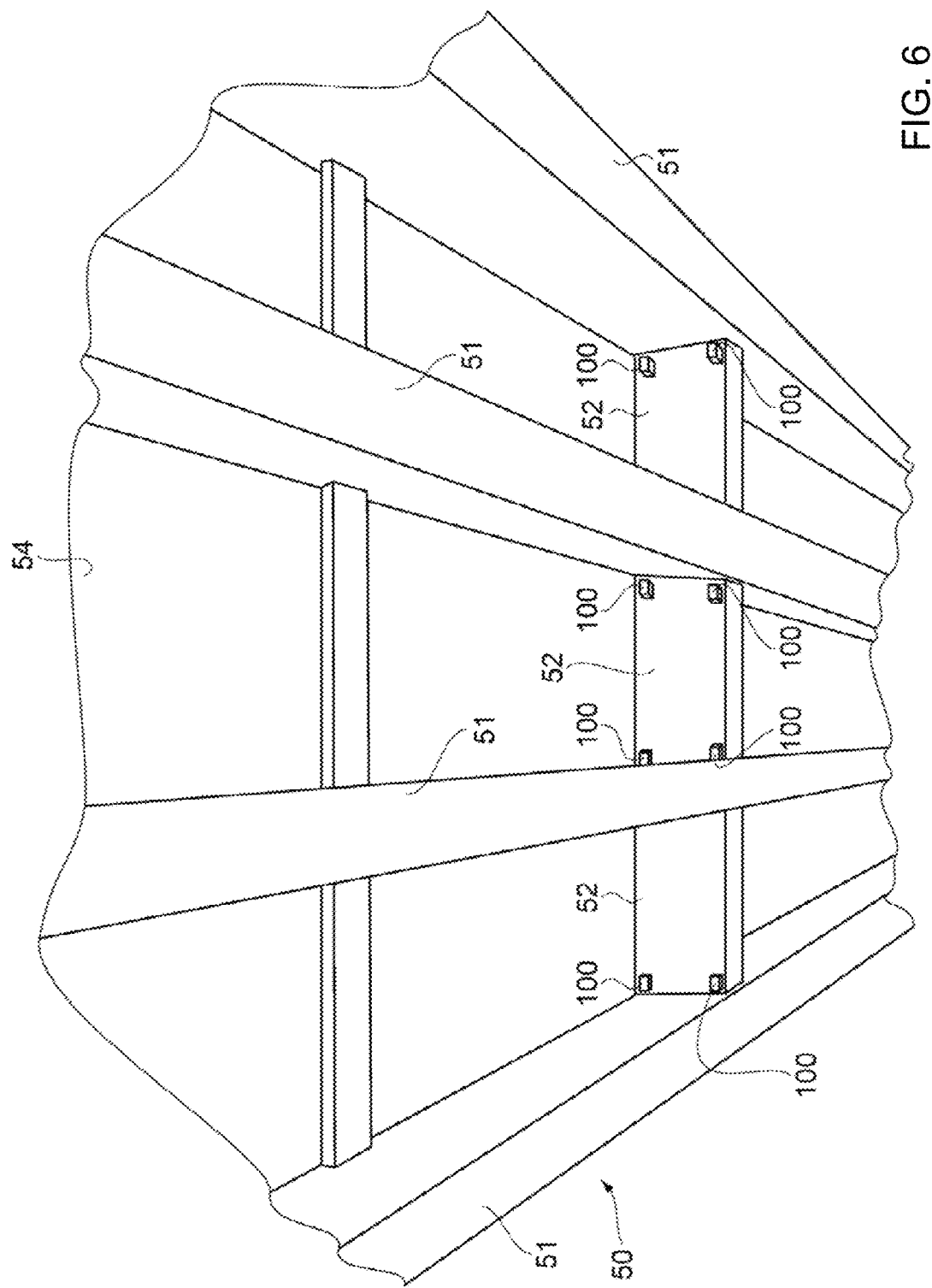
FIG. 6 is a perspective view illustrating locations on a bridge in which the acceleration detector is disposed.

The acceleration detector 100 serving as the physical quantity sensor will now be described with reference to FIGS. 4, 5, and 6. FIG. 4 is a perspective view illustrating the outer appearance of the acceleration detector. FIG. 5 is a partially exploded perspective view schematically illustrating the configuration of the acceleration sensor. FIG. 6 is a perspective view illustrating locations on the bridge in which the acceleration detector is disposed.

As illustrated in FIG. 4, the acceleration detector 100 serving as the physical quantity sensor includes an acceleration sensor 200 that detects acceleration in respective axial directions of three mutually orthogonal axes, and a cable 140 for supplying power from the outside. Note that an internal power supply built into the acceleration detector 100 may be used as the power supply instead of the cable 140. A drive signal is transmitted to the acceleration sensor 200 of the acceleration detector 100 by a drive circuit, not shown in the figures. Using a detection circuit, not shown in the figures, the acceleration detector 100 detects acceleration variation from a resonance frequency that varies in accordance with acceleration applied to the acceleration sensor 200, and transmits data to the display device 10 and so on either wirelessly or through the cable 140 or the like, for example.

As illustrated in FIG. 5, the acceleration sensor 200 includes a base substrate 201, a heat insulation substrate 202, a base 203, an acceleration detection device 103 housing an acceleration detection element 101 capable of detecting acceleration in one axial direction, an oscillator 204, and a cap 205, and is housed in the interior of the acceleration detector 100.

Although not shown in the figures, the acceleration detection element 101 employs a vibration element constituted by a quartz substrate cut out from a quartz gemstone or the like at a predetermined angle, for example. In the vibration element, a double-ended tuning fork is formed from two vibrating reeds and a pair of base portions, and therefore the vibration element is also referred to as a double-ended tuning fork element (a double-ended tuning fork type vibrating reed). Acceleration can be detected from variation in the resonance frequency, which is generated by deformation of the double-ended tuning fork element when acceleration is applied thereto.

An epoxy resin substrate containing glass fabric, for example, is used as the rectangular flat plate-shaped base substrate 201, and peripheral circuits relating to the acceleration detection device 103 and the oscillator 204 are constituted by circuit elements 201a mounted thereon. The base substrate 201 is also formed with terminals 201b for transmitting and receiving input and output to and from the outside, and holes 201c for attaching the base substrate 201 to the acceleration detector 100.

The rectangular flat plate-shaped heat insulation substrate 202 employs a resin having low thermal conductivity, high thermal resistance, superior electric characteristics and dimensional stability, and so on, such as polybutylene terephthalate (PBT) or liquid crystal polymer (LCP), and is connected to the base substrate 201 across a gap by a plurality of narrow pin-shaped (rod-shaped) connection pins 202a that are inserted and fixed therein in the thickness direction.

The base 203 employs a metal such as aluminum, aluminum alloy, copper, or copper alloy, and is formed in a substantially rectangular parallelepiped shape by cutting or sheet metal working, and fixed to the heat insulation substrate 202 using an adhesive or the like, for example. Note that the resin described above, an aluminum oxide sintered body (a ceramic), or the like may also be used as the base 203.

Two acceleration detection devices 103 and the oscillator 204 are fixed to side faces of the base 203 (surfaces standing upright from the heat insulation substrate 202) by a conductive adhesive or the like, for example. The two acceleration detection devices 103 are fixed to side faces of the base 203 that are adjacent and connected by a right angle. Further, a single acceleration detection device 103 is fixed to an upper face of the base 203 (a surface that is positioned parallel to the heat insulation substrate 202 on the opposite side to the heat insulation substrate 202) by a conductive adhesive or the like, for example. Thus, the acceleration sensor 200 can detect acceleration on three mutually orthogonal axes.

The two acceleration detection devices 103 and the oscillator 204 fixed to the side faces of the base 203 are connected to the connection pins 202a of the heat insulation substrate 202 by lead wires 206 and connected to the base substrate 201 via the connection pins 202a. Further, the acceleration detection device 103 fixed to the upper face of the base 203 is connected to a connection terminal 208 by a lead wire 209 and connected to the connecting pin 202a via the connection terminal 208.

Note that a thermistor 207 is provided near one of the acceleration detection devices 103 as a temperature sensor for detecting the peripheral temperature. The thermistor 207 is provided as temperature detecting means used to detect the peripheral temperature and perform temperature compensation (temperature correction) on the frequency characteristics of the acceleration detection devices 103 and the oscillator 204. Similarly to the acceleration detection devices 103 and the oscillator 204, the thermistor 207 is connected to the connection pin 202a of the heat insulation substrate 202 via a lead wire 206 and connected to the base substrate 201 via the connection pin 202a.

The oscillator 204 is provided as an oscillation source of a reference frequency (a reference resonance frequency) of a comparison circuit, the reference frequency being compared with the resonance frequencies of the acceleration detection devices 103 (the acceleration detectors 100) during acceleration detection.

Similarly to the heat insulation substrate 202, a resin (PBT, ABS, PC, or the like) having low thermal conductivity is used for the cap 205, which takes the shape of a box having an opening on the base substrate 201 side, and the cap 205 is fixed to the base substrate 201 so as to cover the heat insulation substrate 202, the base 203, the acceleration detection devices 103, the thermistor 207, the oscillator 204, the circuit elements 201a, and so on mounted on the base substrate 201.

With these configurations, the acceleration sensor 200 can delay the arrival of peripheral temperature variation at the acceleration detection devices 103. More specifically, heat conduction generated by contact from the base substrate 201 is delayed by the narrow pin-shaped connection pins 202a and the heat insulation substrate 202 formed using low thermal-conductivity resin, while heat conduction caused by convection in the atmosphere around the acceleration detection devices 103 and radiant heat from external members is delayed by the cap 205, which is formed using low thermal-conductivity resin so as to form a shield against outside air and radiant heat sources. In the acceleration sensor 200, by delaying the arrival of peripheral temperature variation at the acceleration detection devices 103 in this manner, temperature variation in the acceleration detection devices 103 can be made gentler, and as a result, the acceleration detection precision and so on, for example, of the acceleration detection devices 103 (the acceleration detection element 101) can be maintained in a favorable state.

Note that the base material of the acceleration detection element 101 is not limited to quartz, and a piezoelectric material such as lithium tantalate (LiTaO$_3$), lithium tetraborate (Li$_2$B$_4$O$_7$), lithium niobite (LiNbO$_3$), lead zirconate titanate (PZT), zinc oxide (ZnO), or aluminum nitride (AlN), or a semiconductor material such as silicon having a piezoelectric material such as zinc oxide (ZnO) or aluminum nitride (AlN) as a coating, may be used instead.

In the first embodiment, as illustrated in FIG. 6, the acceleration detectors 100 are disposed between one pier 55 and another pier 55 (see FIG. 1) of the bridge 50 on the crossbeams 52 near the main girders 51. The acceleration detectors 100 are disposed on the crossbeams 52 near each of four main girders 51 both near a rear surface 54 serving as an opposite surface to a road surface 53 (see FIG. 1) and near an end removed from the rear surface 54 so that a total of eight acceleration detectors 100 are disposed.

1.5. Display Method Relating to Displacement of Structure

Next, a method of displaying an image showing displacement information on the display part 16 of the display device 10 will be described. The display method according to the first embodiment includes calculating the displacement amount of the bridge 50 serving as the structure based on the output signals output respectively from the plurality of acceleration detectors 100 disposed on the bridge 50, generating image information from which the displacement of the bridge 50 is visually recognizable based on the displacement amount of the bridge 50, and displaying the image information on the display device 10. According to this display method, image information from which the displacement of the bridge 50 is visually recognizable is generated based on the displacement amount of the bridge 50, which is calculated based on the output signals output respectively from the plurality of acceleration detectors 100, whereupon the image information is displayed on the display device 10, and therefore the manager (the user) can objectively recognize and determine the state of the bridge 50 by means of visual recognition.

Further, in the step of generating the image information in the display method described above, the image information which changes in response to change in the displacement amount of the bridge 50 is preferably generated by using at least one of color, shading, lines, dots, circles, numerical values, symbols, loci, graphs, histograms, and waveforms. Hence, in the step for generating the image information, the image information which changes in response to change in the displacement amount of the structure is generated by using at least one of color, shading, lines, points, circles, numerical values, symbols, loci, graphs, histograms, and waveforms and then displayed as an image on the display device 10, and therefore the information manager (the user) can recognize the state of the structure, for example the bridge 50, easily from the displayed image. Here, the lines forming the image information include the colors of the lines, the types of the lines, the thicknesses of the lines, the lengths of the lines, and so on, while the dots, circles, and symbols include the colors, shapes, sizes, patterns, and so on thereof.

Figure 7A:
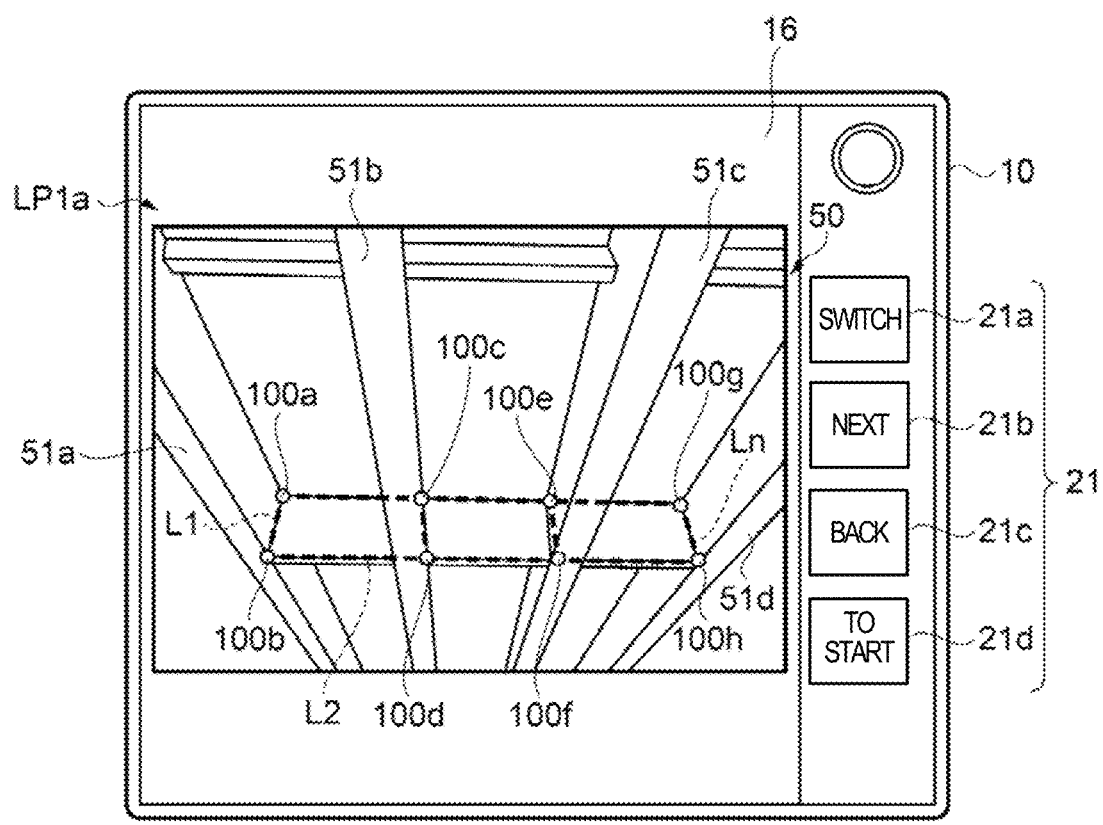
FIG. 7A illustrates a display example relating to the state of the bridge prior to displacement.
Figure 7B:
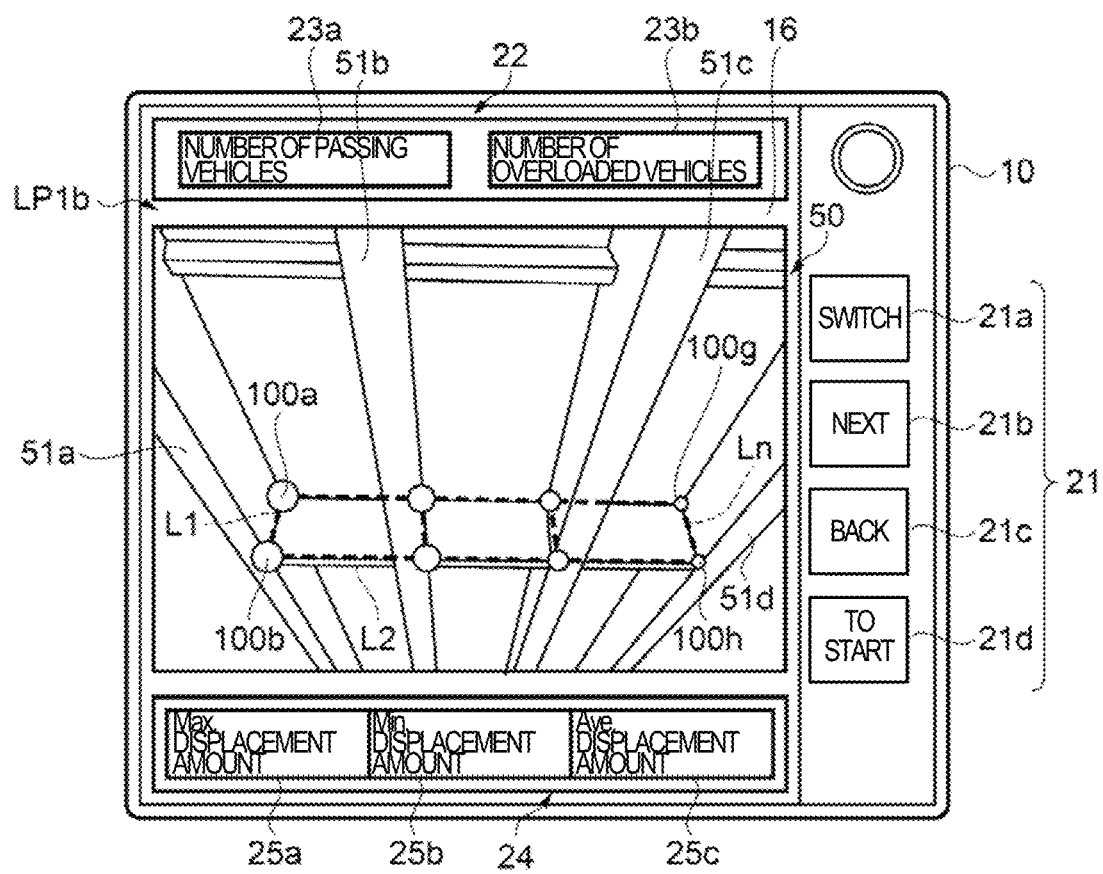
FIG. 7B illustrates a first display example relating to displacement of the bridge.
Figure 8:
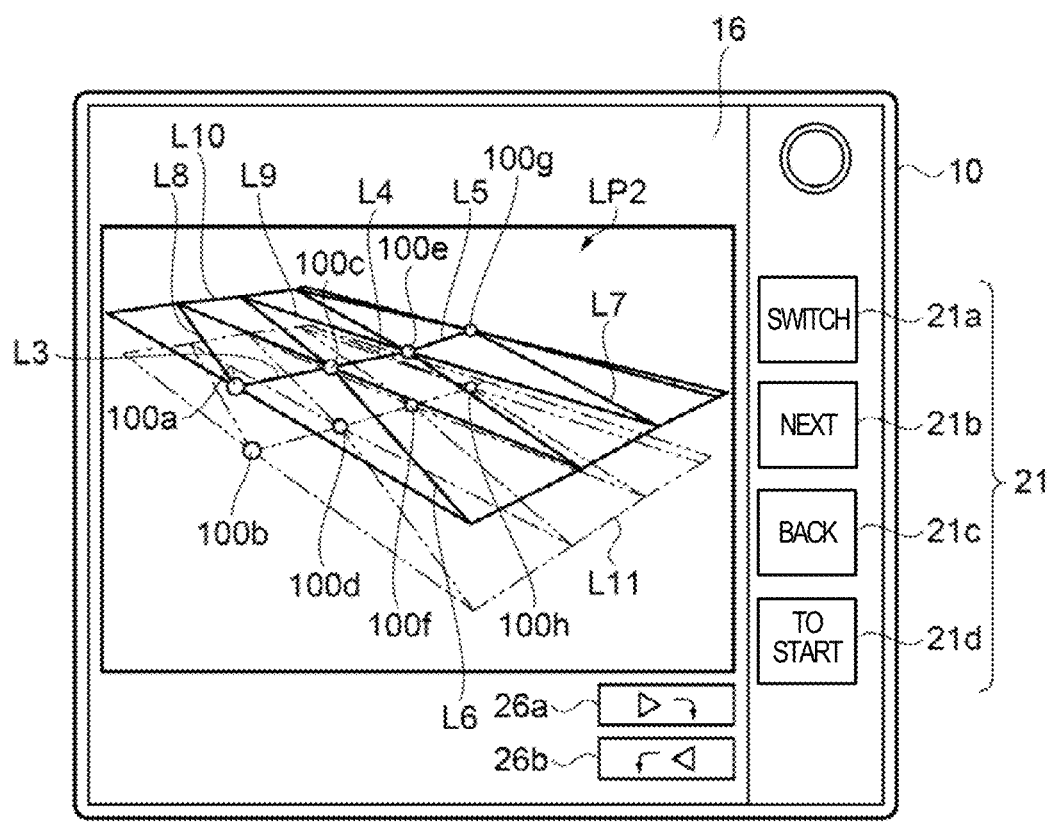
FIG. 8 illustrates a second display example relating to displacement of the bridge.
Figure 9:
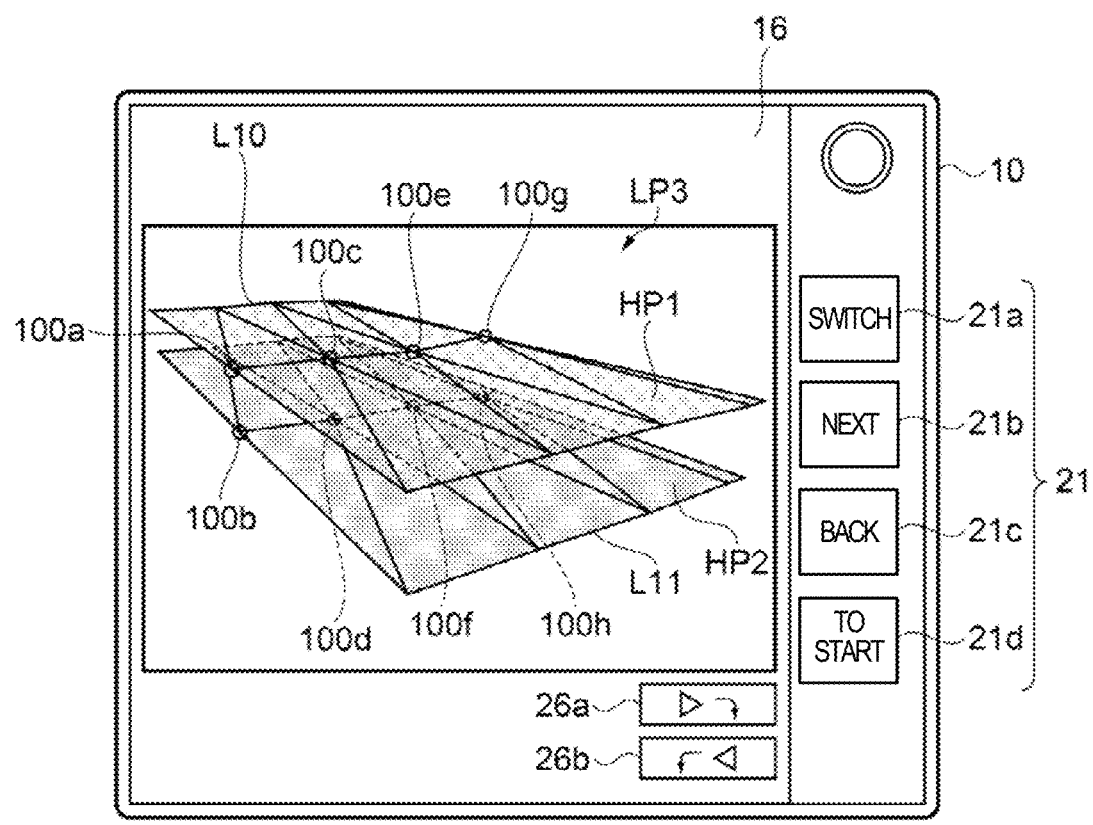
FIG. 9 illustrates a third display example relating to displacement of the bridge.
Figure 10:
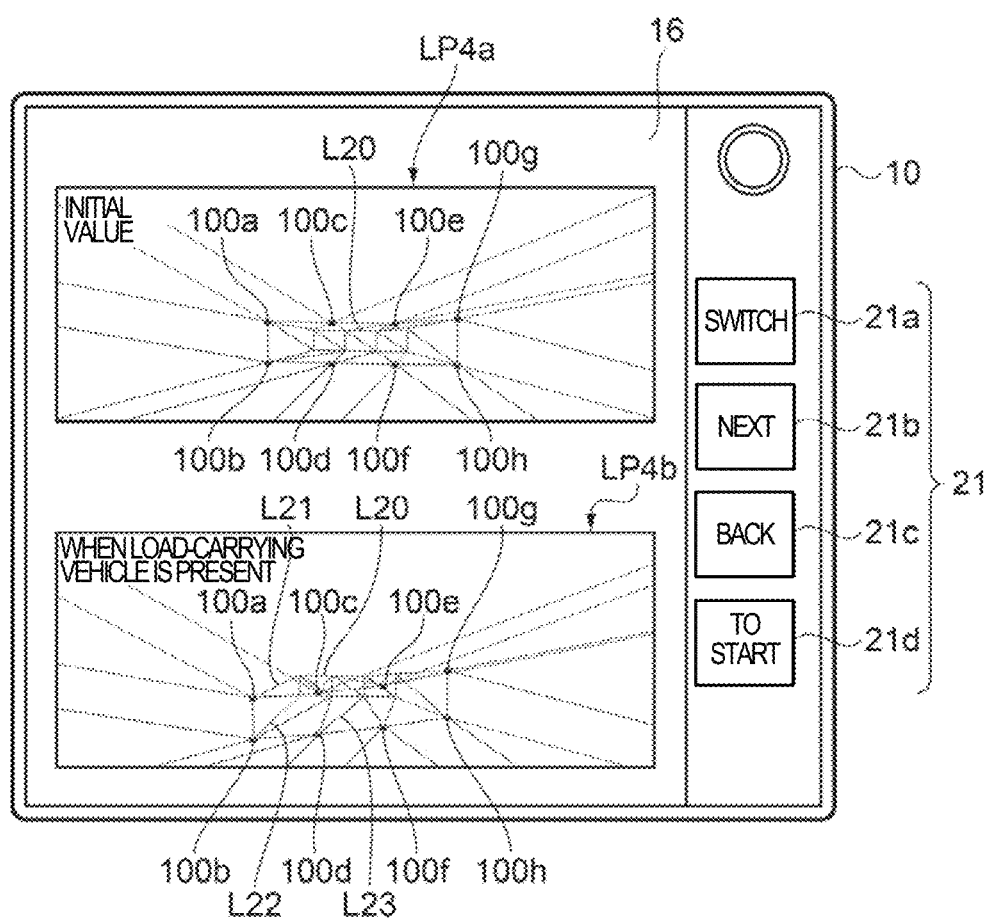
FIG. 10 illustrates a fourth display example relating to displacement of the bridge.
Figure 11:
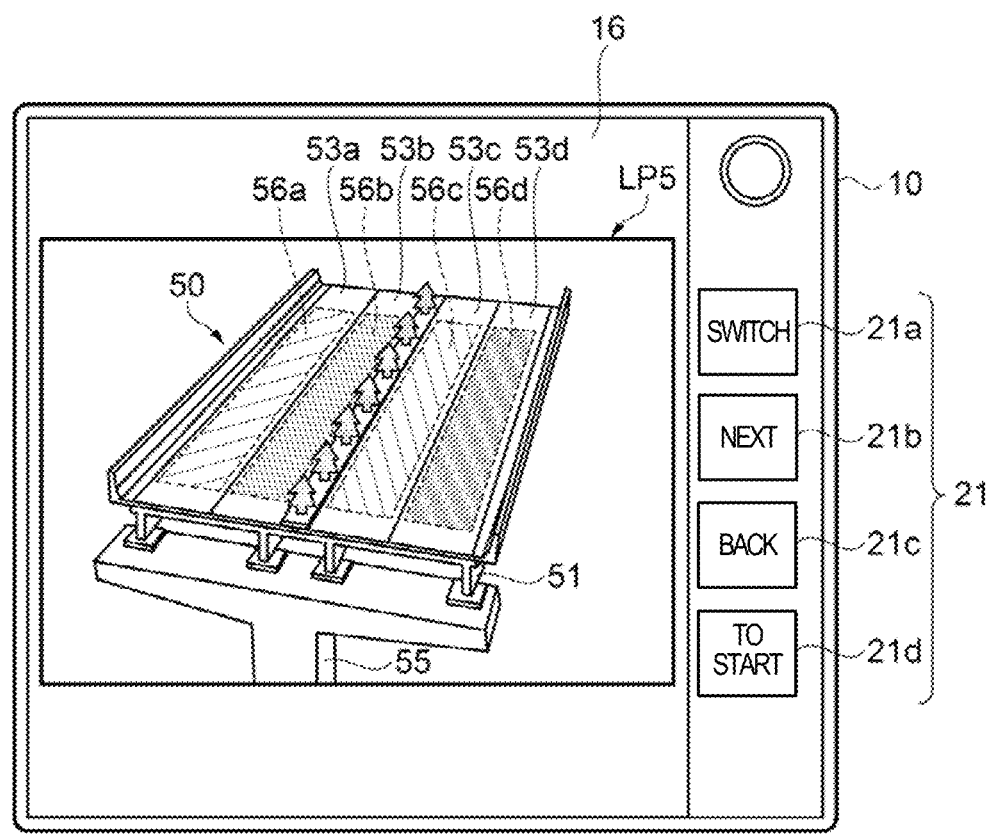
FIG. 11 illustrates a fifth display example relating to displacement of the bridge.
Figure 12:
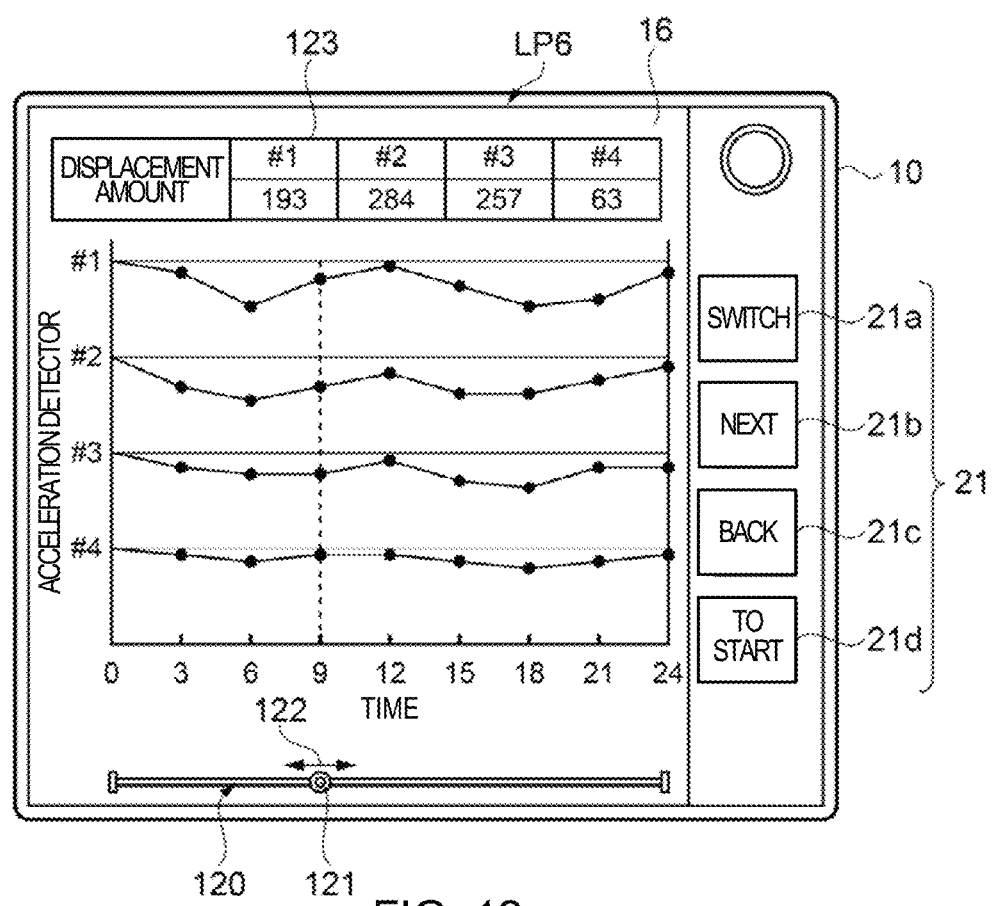
FIG. 12 illustrates a sixth display example relating to displacement of the bridge.
Figure 13:
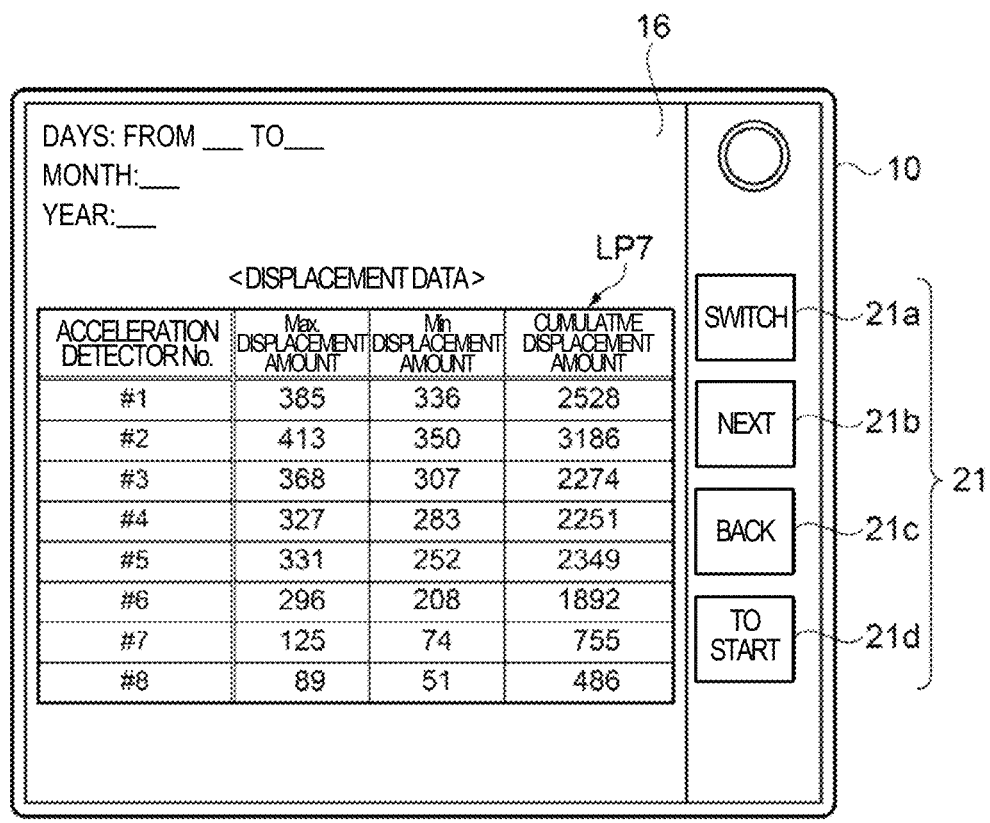
FIG. 13 illustrates a seventh display example relating to displacement of the bridge.
Figure 14:
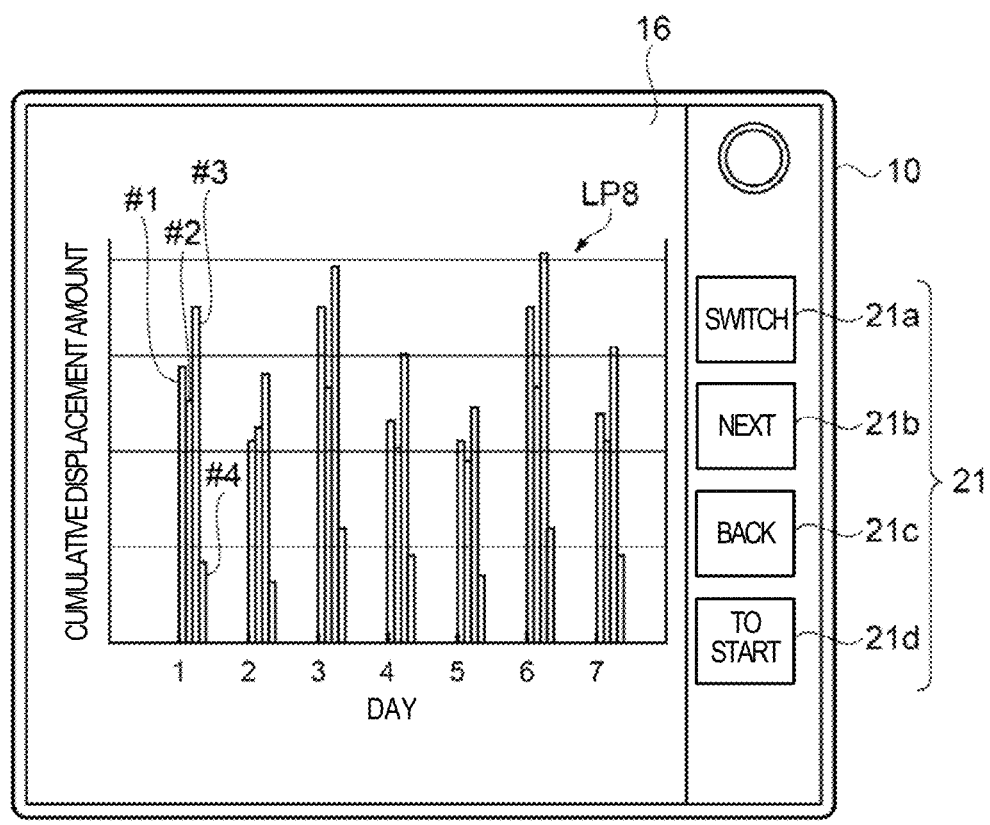
FIG. 14 illustrates an eighth display example relating to displacement of the bridge.
Figure 15:
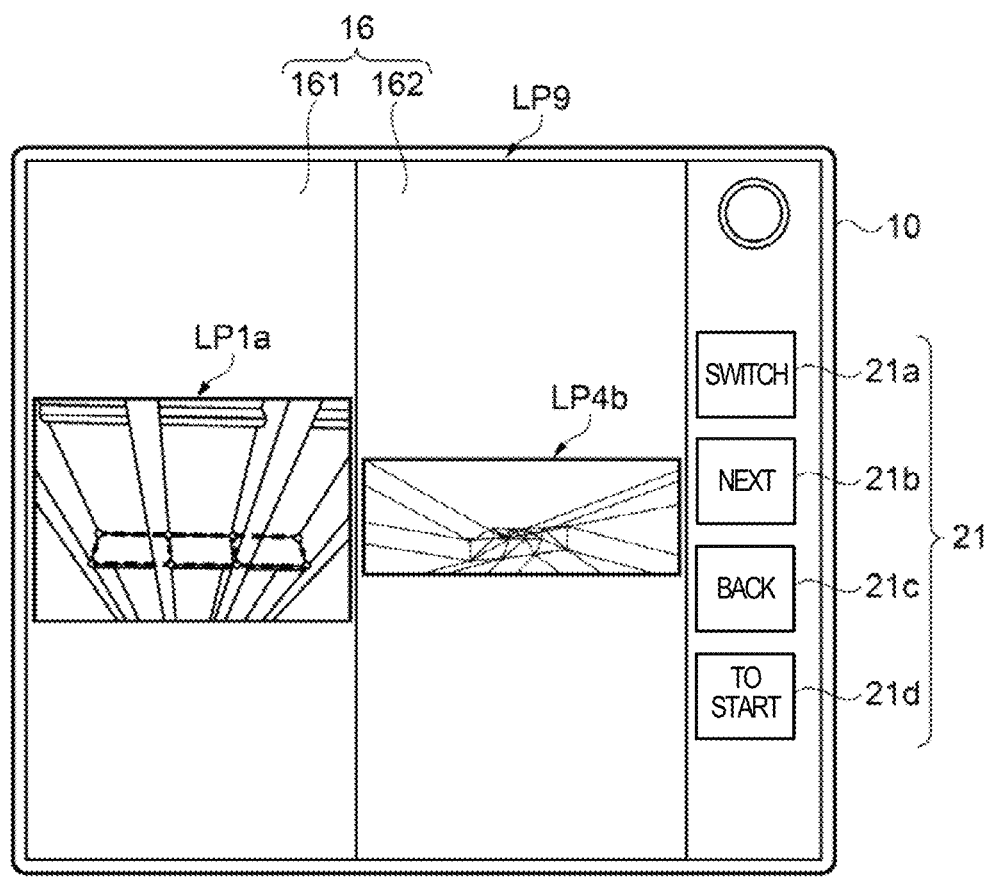
FIG. 15 illustrates a ninth display example relating to displacement of the bridge.

1.6. Examples of Displays on Display Device Relating to Displacement of Structure Next, specific display examples of images displayed on the display part 16 will be described with reference to FIGS. 7A to 15. FIG. 7A illustrates a display example relating to the state of the bridge prior to displacement. FIG. 7B illustrates a first display example relating to displacement of the bridge. FIG. 8 illustrates a second display example relating to displacement of the bridge. FIG. 9 illustrates a third display example relating to displacement of the bridge. FIG. 10 illustrates a fourth display example relating to displacement of the bridge. FIG. 11 illustrates a fifth display example relating to displacement of the bridge. FIG. 12 illustrates a sixth display example relating to displacement of the bridge. FIG. 13 illustrates a seventh display example relating to displacement of the bridge. FIG. 14 illustrates an eighth display example relating to displacement of the bridge. FIG. 15 illustrates a ninth display example relating to displacement of the bridge.

1.6.1. First Display Example

First, referring to FIGS. 7A and 7B, a first display example illustrating the state of displacement of the bridge 50 will be described. Note that FIG. 7A illustrates, as the image information, a display example of the bridge 50 in a non-displaced state and the acceleration detectors 100 attached to the bridge 50, while FIG. 7B illustrates a display example of the bridge 50 in a displaced state and the acceleration detectors 100 attached to the bridge 50. In FIGS. 7A and 7B, the main girders 51 of the bridge 50 (see FIG. 6) will be described separately as a first main girder 51$a$ positioned on the left-side end of the figure, a second main girder 51$b$ and a third main girder 51$c$, which are disposed so as to approach the right-side end from the side of the first main girder 51$a$, and a fourth main girder 51$d$ positioned on the right-side end.

An image LP1$a$ serving as the image information illustrated in FIG. 7A is rendered on the display part 16 and shows the bridge 50 serving as the structure in a non-displaced state. A model image of the bridge 50 seen in perspective from the main girder 51 side of the bridge 50 (see FIG. 6) is rendered on the display part 16, while eight circles 100$a$, 100$b$, 100$c$, 100$d$, 100$e$, 100$f$, 100$g$, 100$h$ serving as symbols representing the respective positions of the plurality of acceleration detectors 100 (see FIG. 6) disposed on the crossbeams 52 (see FIG. 6) near the main girders 51 of the bridge 50 and ten line segments L1, L2, . . . Ln linking the circles 100$a$, 100$b$, 100$c$, 100$d$, 100$e$, 100$f$, 100$g$, 100$h$ corresponding to adjacent acceleration detectors 100, among the plurality of acceleration detectors 100, are rendered so as to be superimposed on the model image. Note that in this embodiment, the circles 100$a$ and 100$b$ serve as the symbols corresponding to the acceleration detectors 100 positioned on the first main girder 51$a$ side, and the circles 100$c$, 100$d$, 100$e$, 100$f$, 100$g$, 100$h$ are arranged rightward therefrom. Further, in this embodiment, the line segment L1 linking the circle 100$a$ to the circle 100$b$, the line segment L2 linking the circle 100$b$ to the circle 100$d$, and the line segment Ln linking the circle 100$g$ to the circle 100$h$ are shown as symbols serving as representative examples of the line segments L1, L2, . . . Ln.

The circles 100$a$ to 100$h$ and the line segments L1, L2, . . . Ln are configured so that the sizes of the circles and so on, for example, can change in response to change in the displacement amount of the bridge 50, or in other words as the magnitude of the displacement amount of the bridge 50 changes. Further, the circles 100*a* to 100*h* and the line segments L1, L2, . . . Ln can be displayed by using at least one of color, line type, circle size, and line thickness. By varying at least one of the colors, line types, circle sizes, and line thicknesses of the circles 100*a* to 100*h* and the line segments L1, L2, . . . Ln as the magnitude of the displacement amount of the bridge 50 changes, the magnitude of the displacement amount can be expressed. Hence, by displaying the circles 100*a* to 100*h* and the line segments L1, L2, . . . Ln on the display part 16 using at least one of color, line type, circle size, and line thickness as the image information that changes based on variation in the displacement amount of the bridge 50, the manager (the user) can easily recognize the state of the structure.

An image LP1*b* serving as the image information illustrated in FIG. 7B is rendered on the display part 16 and shows a state in which the bridge 50 serving as the structure has been displaced by the passage of a vehicle or the like carrying a heavy load, for example. Further, the image LP1*b* includes a first numerical value display part 22 and a second numerical value display part 24 that are capable of showing a specific numerical value of the displacement amount of a displaced part, for example the displacement amount of the part indicated by the circle 100*a*. The first numerical value display part 22 and the second numerical value display part 24 can be displayed in response to an operation performed by the user on the operating buttons 21*a* to 21*d* constituting the operation part 21 or a touch panel or the like constituting the display part 16, for example.

On the image LP1*b*, the diameters (sizes) of the circles 100*a* to 100*h* are shown in approximate proportion to the displacement amount of the bridge 50. More specifically, on the image LP1*b*, the diameters of the circles 100*a* and 100*b* near the first main girder 51*a* positioned on the left side of the figure are shown to be large, while the diameters of the circles 100*g* and 100*h* near the fourth main girder 51*d* positioned on the right side of the figure are shown to be small. This indicates that the displacement amount near the first main girder 51*a* is larger than the displacement amount near the fourth main girder 51*d*. Further, the circles 100*c*, 100*d*, 100*e*, and 100*f* positioned between the circles 100*a* and 100*b* and the circles 100*g* and 100*h* are displayed at a diameter having a length that is between the diameter of the circle 100*a* and the diameter of the circle 100*g*. This indicates that the displacement amount near the second main girder 51*b* and the third main girder 51*c* is a displacement amount between the displacement amount near the first main girder 51*a* and the displacement amount near the fourth main girder 51*d*.

Note that the displacement amount of the bridge 50 displayed on the image LP1*b* is indicated by relative values of the plurality of calculated displacement amounts from the plurality of acceleration detectors 100. By indicating the displacement amounts of the respective sites of the bridge 50 in which the acceleration detectors 100 are disposed using relative values of the plurality of calculated displacement amounts from the plurality of acceleration detectors 100 in this manner, the manager (the user) can easily recognize comparisons between displacement magnitudes in different sites of the acceleration detectors 100.

By operating the operating buttons 21*a*, 21*b*, 21*c*, 21*d* serving as the operation part 21, the touch panel constituting the display part 16, or the like, for example, the user can display and delete the first numerical value display part 22 and the second numerical value display part 24 or select an item displayed thereon.

The first numerical value display part 22 includes a box 23*a* showing the number of vehicles that have passed over the bridge 50 within a predetermined period, and a box 23*b* showing a number of passing vehicles that can be determined to exceed a preset overload reference value (overload). Note that the detection of passing vehicles that can be determined to exceed the overload reference value (overload) can be calculated by a weight measurement device (not shown) provided on the bridge 50, or by the calculator 12 from the acceleration data detected by the acceleration detectors 100. Hence, information about an overload is displayed on the display part 16 in addition to the image information showing the state of the bridge 50, and therefore the manager (the user) can check both the state of the bridge 50 and the information about the overload at a single glance.

The second numerical value display part 24 includes a box 25*a*, a box 25*b*, and a box 25*c* respectively showing a maximum value (Max.), a minimum value (Min.), and an average value (Ave.) of the displacement amount in the position of the selected circle 100*b*, for example, within a predetermined period.

Hence, in the display device 10 to which the display method according to the first display example is applied, the circles 100*a* to 100*h* and the line segments L1, L2, . . . Ln are displayed on the display part 16 using at least one of color, line type, circle size, and line thickness as the image information that changes in response to change in the displacement amount of the bridge 50, and therefore the manager (the user) can easily recognize the state of the structure.

Further, in the display device 10 to which the display method according to the first display example is applied, the displacement amounts of the respective sites of the bridge 50 in which the acceleration detectors 100 are disposed are displayed by using relative values of the plurality of calculated displacement amounts from the plurality of acceleration detectors 100, and therefore the manager (the user) can easily recognize comparisons between displacement magnitudes in different sites of the acceleration detectors 100.

Furthermore, in the display device 10 to which the display method according to the first display example is applied, the image information is displayed so as to be superimposed on a model image corresponding to the bridge 50, and therefore the manager (the user) can check the image information relating to the respective sites of the bridge 50 at a single glance.

1.6.2. Second Display Example

Next, referring to FIG. 8, a second display example of the image information displayed on the display device 10 and showing the state of displacement of the bridge 50 (see FIG. 6) will be described.

An image LP2 serving as the image information illustrated in FIG. 8 is rendered on the display part 16 and shows eight circles 100*a*, 100*b*, 100*c*, 100*d*, 100*e*, 100*f*, 100*g*, 100*h*, which serves as symbols representing the respective positions of the plurality of acceleration detectors 100 (see FIG. 6) disposed on the crossbeams 52 (see FIG. 6) near the main girders 51 of the bridge 50, and line segments L3 to L10. By varying the positions and sizes of the circles 100*a*, 100*b*, 100*c*, 100*d*, 100*e*, 100*f*, 100*g*, 100*h* or the inclines, lengths, thicknesses, line types, and so on of the line segments L3 to L10 based on the output data from the acceleration detectors 100, the displacement amount of the bridge 50 can be displayed visually.

The image LP2 will now be described in further detail. The image LP2 is displayed as a so-called wireframe view constituted by a line display image that forms a single frame corresponding to the acceleration detectors 100 positioned on the road surface side (the road surface 53 (see FIG. 1)) of the crossbeams 52, and a line display image that forms a single frame corresponding to the acceleration detectors 100 positioned on the lower end parts of the crossbeams 52 on the opposite side to the road surface side.

More specifically, the line display image corresponding to the acceleration detectors 100 positioned on the road surface side of the crossbeams 52 is configured to include the circles 100a, 100c, 100e, and 100g, a rectangular outline L10 passing through the circle 100a and the circle 100g positioned on the outside, a plurality of line segments (the line segments L8 and L9, for example) respectively linking predetermined positions on the outline L10 to the circles 100a, 100c, 100e, and 100g, and three line segments L3, L4, L5 linking the circles 100a, 100c, 100e, and 100g corresponding to the adjacent acceleration detectors 100.

Further, the line display image corresponding to the acceleration detectors 100 positioned on the lower end parts of the crossbeams 52 on the opposite side to the road surface side is configured similarly to the line display image corresponding to the acceleration detectors 100 positioned on the road surface side of the crossbeams 52, described above. More specifically, the line display image corresponding to the acceleration detectors 100 positioned on the lower end parts of the crossbeams 52 on the opposite side to the road surface side is configured to include the other four circles 100b, 100d, 100f, and 100h, a rectangular outline L11 passing through the circle 100b and the circle 100h positioned on the outside, a plurality of line segments linking the other four circles 100b, 100d, 100f, and 100h, and three line segments linking the circles 100b, 100d, 100f, and 100h corresponding to the adjacent acceleration detectors 100. Note that in order to simplify the figure, reference symbols have been omitted from the line segments that are configured identically to those of the line display image positioned on the road surface side.

Hence, in the display device 10 to which the display method according to the second display example is applied, a line display image including the plurality of line segments L3 to L9 linking the circles 100a, 100c, 100e, 100g corresponding to the adjacent acceleration detectors 100, for example, among the plurality of acceleration detectors 100 (see FIG. 6) is used, and therefore displacement of and the displacement amount of the bridge 50 can be recognized visually from variation in the inclines of the line segments L3 to L9 or variation in the lengths and orientations of the line segments L3 to L9. As a result, the manager (the user) can recognize the state of the structure more easily.

Note that the display part 16 of the display device 10 displaying the image LP2 may be provided with first tags 26a and 26b constituted by a touch panel, for example. By operating the first tags 26a and 26b, the display angle of the image LP2 serving as the displayed line display image can be varied. More specifically, by touching one of the first tags 26a with a finger or the like, for example, the image LP2 can be rotated to the right, and by touching the other first tag 26b with a finger or the like, for example, the image LP2 can be rotated to the left. By operating the first tags 26a and 26b in this manner, the angle of the line display image, or in other words the direction in which the manager (the user) views the display, can be varied, and as a result, the manager (the user) can recognize the state of displacement of the structure (the bridge 50) more easily.

1.6.3. Third Display Example

Next, referring to FIG. 9, a third display example of the image information displayed on the display device 10 and showing the state of displacement of the bridge 50 (see FIG. 6) will be described.

An image LP3 serving as the image information illustrated in FIG. 9 is rendered on the display part 16 as a line display image having a similar configuration to the second display example. On the image LP3, a virtual plate HP1 and a virtual plate HP2 are shaded so as to take on the appearance of plates, the virtual plate HP1 being positioned inside the rectangular outline L10 that passes through the circles 100a and 100g positioned on the outside of the line display image corresponding to the acceleration detectors 100 positioned on the road surface side (the road surface 53 (see FIG. 1)) of the crossbeams 52 and the virtual plate HP2 being positioned inside the rectangular outline L11 that passes through the circles 100b and 100h positioned on the outside of the line display image corresponding to the acceleration detectors 100 positioned on the lower end parts of the crossbeams 52 on the opposite side to the road surface side.

By shading the interior of the rectangular outline L11 passing through the circles 100a and 100g and the rectangular outline L11 passing through the circles 100b and 100h so as to resemble plates in this manner, the manager (the user) can view a reference plane more easily and thereby ascertain the situation regarding displacement of the bridge 50 more accurately.

1.6.4. Fourth Display Example

Next, referring to FIG. 10, a fourth display example of the image information displayed on the display device 10 and showing the state of displacement of the bridge 50 (see FIG. 6) will be described. In the fourth display example illustrated in FIG. 10, two sets of image information positioned vertically are rendered. By operating the operating button 21a that is included in the operation part 21 provided on the display device 10, either an image LP4a or an image LP4b, for example, can be enlarged so as to fill the entire display part 16, or the images LP4a and LP4b can be displayed side by side on the display part 16. Although not shown in the figure, a tag may be provided on the display part 16 in place of the operating button 21a so that the screen can be switched by operating the tag.

The image LP4a serving as the image information illustrated in FIG. 10 is rendered on the display part 16 to show the bridge 50 in a non-displaced state. On the image LP4a, a line display image including eight circles 100a, 100b, 100c, 100d, 100e, 100f, 100g, 100h serving as symbols representing the respective positions of the plurality of acceleration detectors 100 (see FIG. 6) disposed on the crossbeams 52 (see FIG. 6) near the main girders 51 of the bridge 50, a reference frame L20, and a plurality of line segments, such as line segments L21, L22, L23, for example, linking the eight circles 100a, 100b, 100c, 100d, 100e, 100f, 100g, 100h to the reference frame L20 is displayed in the form of a so-called wireframe view.

The image LP4b serving as the image information illustrated in FIG. 10 is rendered on the display part 16 to show the bridge 50 in a displaced state occurring when a vehicle or the like carrying a heavy load, for example, crosses the bridge 50. In response to the displacement of the bridge 50, the positions of the eight circles 100a, 100b, 100c, 100d, 100e, 100f, 100g, 100h are shown to change, and in accompaniment therewith, the inclines and lengths of the plurality of line segments, such as the line segments L21, L22, L23, for example, are shown to change from the image LP4a.

In the display device 10 using the images LP4a and LP4b according to the fourth display example, the image LP4a showing the bridge 50 in a non-displaced state and the image LP4b showing the bridge 50 in a displaced state can be displayed side by side on the display part 16, and therefore the manager (the user) can visually ascertain the situation regarding displacement of the bridge 50 with a high degree of accuracy.

Further, in the display device 10 to which the display method according to the fourth display example is applied, displacement of the bridge 50 can be visually ascertained from variation in the lengths and inclines of the plurality of line segments, such as the line segments L21, L22, L23, for example, and therefore the manager (the user) can recognize the state of the structure (the bridge 50) more easily.

1.6.5. Fifth Display Example

Next, referring to FIG. 11, a fifth display example of the image information displayed on the display device 10 and showing the state of displacement of the bridge 50 (see FIG. 6) will be described. In the fifth display example illustrated in FIG. 11, display regions 56a, 56b, 56c, 56d displaying the displacement amount of the bridge 50, as seen from the road surface side, in each of a plurality of lanes (lanes 53a, 53b, 53c, 53d) are rendered so as to be superimposed on the lanes (the lanes 53a, 53b, 53c, 53d).

On an image LP5 serving as the image information illustrated in FIG. 11, the display regions 56a, 56b, 56c, 56d are provided to correspond to the positions in which the acceleration detectors 100 (see FIG. 6) are attached, and the display regions 56a, 56b, 56c, 56d are displayed so as to be distinguishable from each other by varying the respective colors, brightnesses, shading patterns, and so on thereof based on the respective displacement amounts therein.

In the display device 10 using the image LP5 according to the fifth display example, by viewing, on the display part 16, the display regions 56a, 56b, 56c, 56d provided on the road surface side (the road surface 53 (see FIG. 1)) so as to correspond to the positions in which the acceleration detectors 100 (see FIG. 6) are attached, the manager (the user) can visually ascertain the displacement of the bridge 50. As a result, the manager (the user) can recognize the state of the structure (the bridge 50) easily from the road surface side.

1.6.6. Sixth Display Example

Next, referring to FIG. 12, a sixth display example of the image information displayed on the display device 10 and showing the state of displacement of the bridge 50 (see FIG. 6) will be described.

On an image LP6 relating to the sixth display example illustrated in FIG. 12, the displacement amount of the bridge 50 over a single day is displayed in time series for each of four acceleration detectors 100 (see FIG. 6) numbered #1 to #4 using a line graph. Further, the display part 16 is provided with a selector 120 and a box 123 showing absolute values of the respective displacement amounts of the acceleration detectors 100 at a selected time. For displaying the displacement amounts in the box 123, the user selects a time by sliding a second tag 121, which is provided on the selector 120 and used for time selection, in the direction of an arrow 122 while touching the screen of the display part 16, or in other words, stroking the screen of the display part 16. The numerical values are displayed in the box 123 in accordance with the selected time.

Note that by operating the operating buttons 21a, 21b, 21c, and so on included in the operation part 21 provided on the display device 10, a line showing a large displacement amount, for example, can be enlarged, or times before and after a time at which a large displacement amount occurred can be extracted and enlarged. Further, although not shown in the figure, a tag may be provided on the display part 16 in place of the operating button 21a so that the screen can be switched by operating the tag. Furthermore, by operating the operating button 21b or the operating button 21c, it is possible to return to the image LP5 of the fifth display example or advance to an image LP7 to be described below, for example.

In the display device 10 using the image LP6 according to the sixth display example, image information about the state of the bridge 50 at a selected time can easily be displayed on the display part 16 by operating the second tag 121 used for time selection, or in other words stroking (operating) the second tag 121 used for time selection.

1.6.7. Seventh Display Example

Next, referring to FIG. 13, a seventh display example of the image information displayed on the display device 10 and showing the state of displacement of the bridge 50 (see FIG. 6) will be described.

On the image LP7 serving as the seventh display example illustrated in FIG. 13, the maximum value (Max.), the minimum value (Min.), and the average value (Avr.) of the displacement amount of the bridge 50 within a predetermined period are displayed for each of the acceleration detectors 100 (see FIG. 6) as a list of numerical value information.

In the display device 10 using the image LP7 according to the seventh display example, numerical value information corresponding to the displacement amount of the bridge 50 within a predetermined period can be checked on a list from the image LP7 displayed on the display part 16. As a result, the manager (the user) can recognize the state of the structure (the bridge 50) easily.

1.6.8. Eighth Display Example

Next, referring to FIG. 14, an eighth display example of the image information displayed on the display device 10 and showing the state of displacement of the bridge 50 (see FIG. 6) will be described.

On an image LP8 serving as the eighth display example illustrated in FIG. 14, a cumulative displacement amount of the bridge 50 over a predetermined period (in this example, seven days) is displayed in the form of a bar graph for each day and each of four acceleration detectors 100 (see FIG. 6). In FIG. 14, #1, #2, #3, and #4 are used as symbols respectively representing the disposed acceleration detectors 100.

In the display device 10 using the image LP8 according to the eighth display example, the displacement amount of the bridge 50 over a predetermined period (seven days) can be checked in time series as a cumulative displacement amount in relation to each of the sites to which the acceleration detectors 100 are attached from the image LP8 displayed on the display part 16. As a result, the manager (the user) can recognize the state of the structure (the bridge 50) easily.

1.6.9. Ninth Display Example

Next, referring to FIG. 15, a ninth display example of the image information displayed on the display device 10 and showing the state of displacement of the bridge 50 (see FIG. 6) will be described.

On an image LP9 serving as the ninth display example illustrated in FIG. 15, two different sets of image information are rendered respectively on a first display screen 161 and a second display screen 162 obtained by dividing the display part 16 into left and right sections in the figure. In this example, the image LP1a described above in the first display example is displayed on the first display screen 161 on the left side, and the image LP4b described above in the fourth display example is displayed on the second display screen 162 on the right side. By operating the operating button 21a included in the operation part 21 provided on the display device 10, either the image LP1a or the image LP4b, for example, can be enlarged so as to fill the entire display part 16, or the images LP1a and LP4b can be displayed side by side on the display part 16. Although not shown in the figure, a tag may be provided on the display part 16 in place of the operating button 21a so that the screen can be switched by operating the tag. Note that since the images LP1a and LP4b were described above, description thereof has been omitted here.

On the image LP9 according to the ninth display example, the image LP1a showing an actual image of the bridge 50 in a non-displaced state and the image LP4b showing a line display image of the bridge 50 in a displaced state can be displayed side by side in the display part 16, and therefore the manager (the user) can visually ascertain the situation regarding displacement of the bridge 50 with a high degree of accuracy while comparing the actual image with the line display image.

Note that in the ninth display example, the display part 16 is divided into two, but division of the display part 16 is not limited to division into two, and as long as the display content can be visually recognized, there is no limit to the number of divisions. Accordingly, the display part 16 may be divided into three, four, five, or more.

The rendered forms and functions described in the first to ninth display examples are not limited to the configurations described above, and the rendered forms and functions described in the first to ninth display examples may be modified by providing the image forms in any of various combinations and switching the functions.

Furthermore, as described above in the sixth display example, by operating the operating buttons 21a, 21b, 21c, and so on included in the operation part 21 provided on the display device 10, the screen displays displayed in the first to ninth display examples, for example, may be switched to different screen displays. The screen can also be switched by operating tags (not shown) provided on the display part 16 in place of the operating buttons 21a, 21b, 21c.

1.6.10. Tenth Display Example

Figure 16:
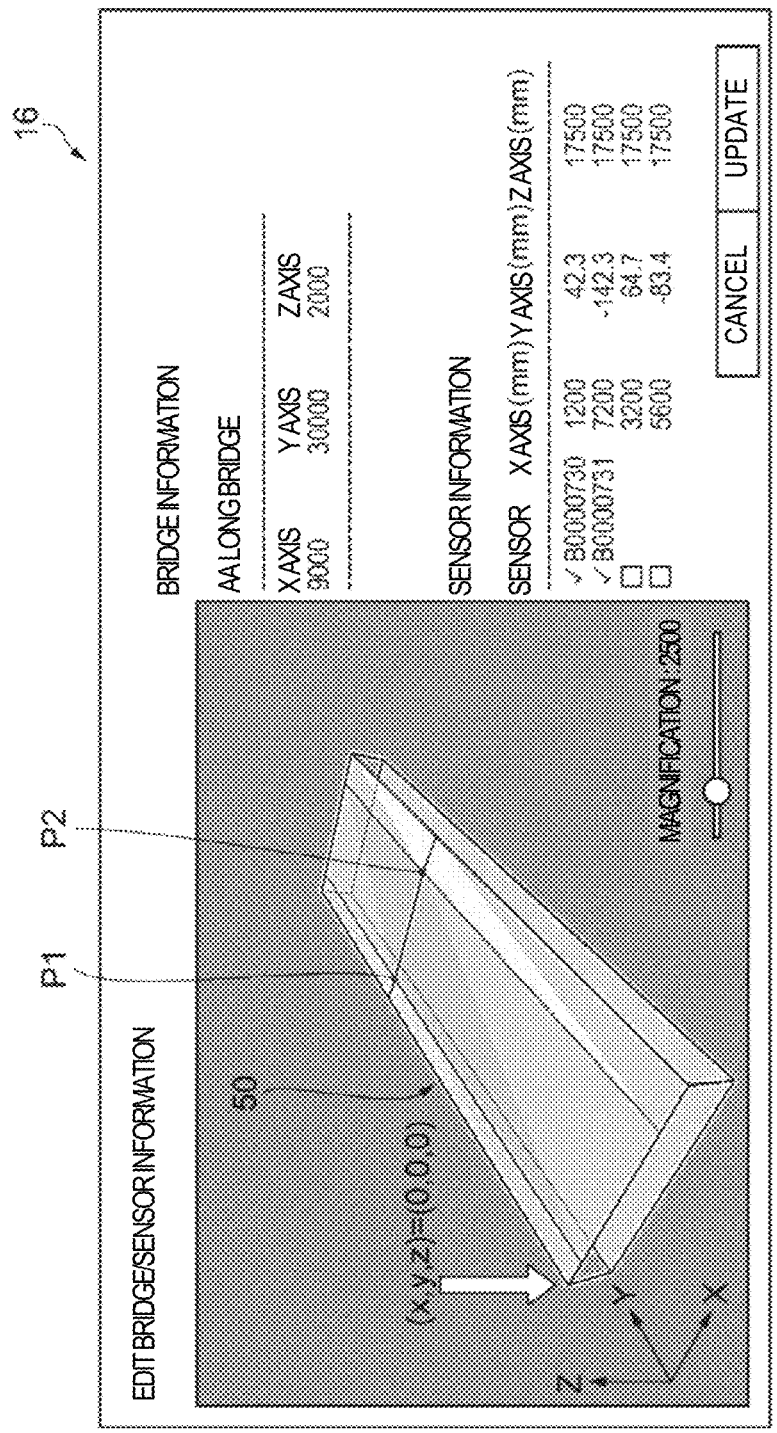
FIG. 16 illustrates a tenth display example relating to displacement of the bridge.

Next, referring to FIG. 16, a tenth display example of an image displayed on the display part 16 in relation to the bridge 50 (see FIG. 6) will be described. FIG. 16 illustrates the tenth display example relating to displacement of the bridge.

Information relating to the relevant bridge, attachment position information relating to the sensors (the acceleration detectors 100) attached to the bridge, and so on are input into an image serving as the tenth display example, illustrated in FIG. 16. Note that in this example, it is assumed that two sensors are disposed. For example, the bridge name "AA Long Bridge" and dimensions including a width "9000 mm", a length "30000 mm", and a thickness "2000 mm" of the bridge in the directions of three mutually orthogonal axes, namely an X axis, a Y axis, and a Z axis can be input on the image as the "bridge information". Further, "B0000730", for example, which serves as a sensor number of the attached sensor (acceleration detector 100), can be input as the "sensor information", and the attachment position of the sensor can be input in the form of distances in the directions of the three axes, namely the X axis, the Y axis, and the Z axis, from a reference point (x, y, z=0, 0, 0) indicated by an arrow in the figure. In response to this input, a virtual image of the bridge 50 and marks P1, P2 showing the attachment positions of the sensors (the acceleration detectors 100) are displayed.

1.6.11. Eleventh Display Example

Figure 17:
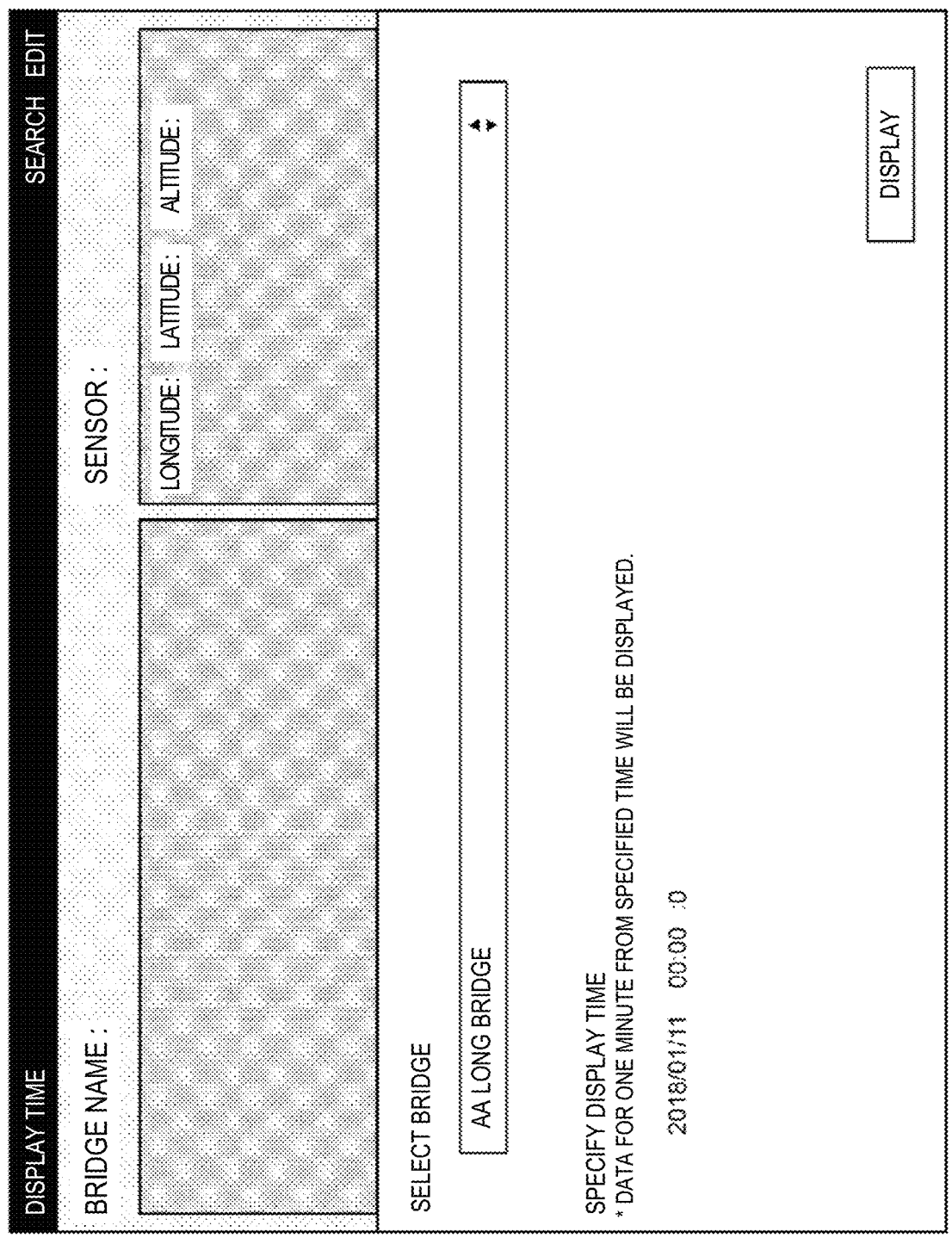
FIG. 17 illustrates an eleventh display example relating to displacement of the bridge.

Next, referring to FIG. 17, an eleventh display example of an image displayed on the display part 16 in relation to the bridge 50 (see FIG. 6) will be described. FIG. 17 illustrates the eleventh display example relating to displacement of the bridge.

The image serving as the eleventh display example, illustrated in FIG. 17, is an image on which the relevant bridge can be selected, and the display time can be specified. On this image, for example, the bridge name "AA Bridge" of the relevant bridge can be selected from "bridge information" input in advance and displayed on a pull-down menu, and in addition, the display time and date can be specified.

1.6.12. Twelfth Display Example

Figure 18A:
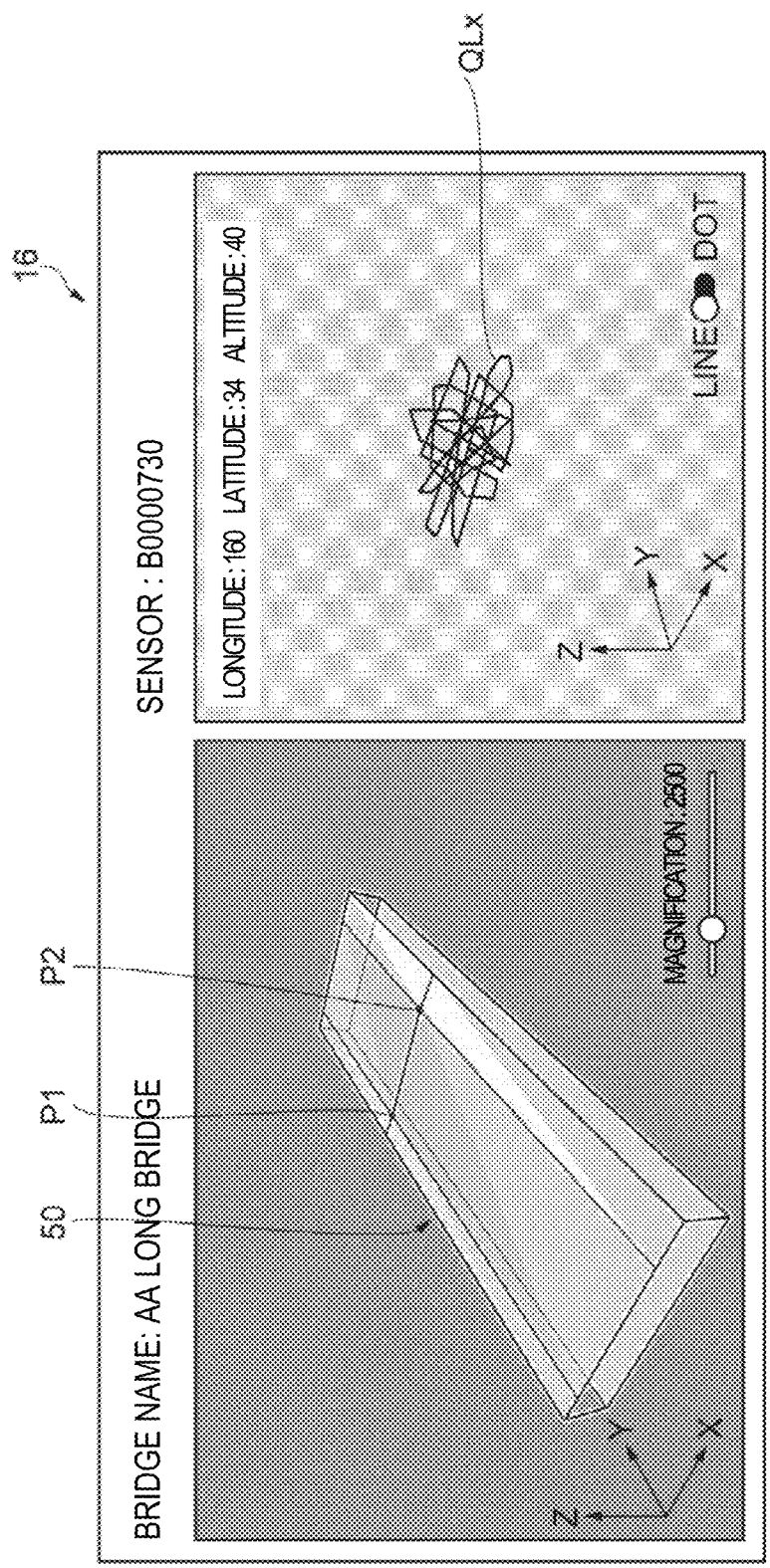
FIG. 18A illustrates a twelfth display example relating to displacement of the bridge.
Figure 18B:
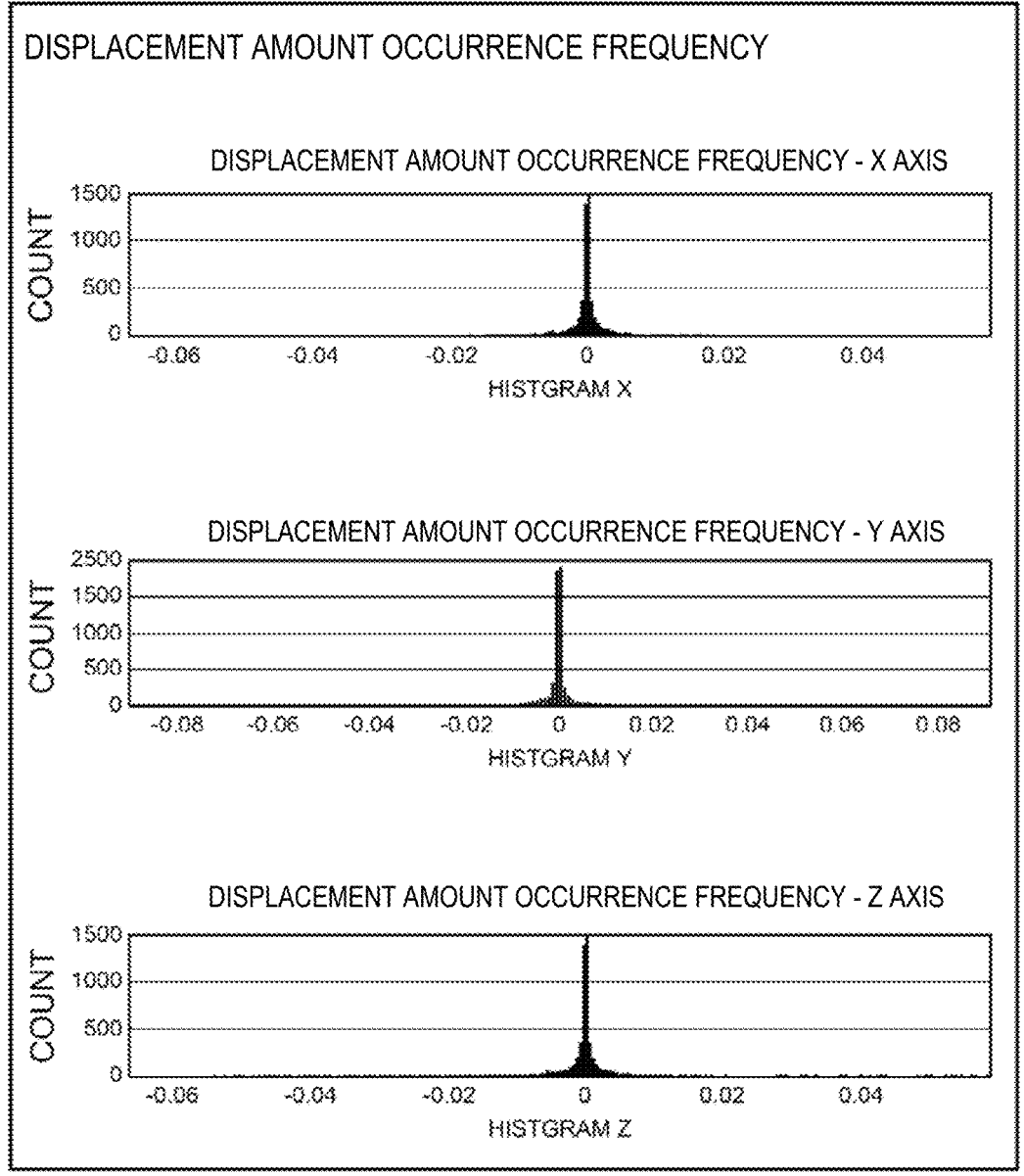
FIG. 18B illustrates the twelfth display example relating to displacement of the bridge.
Figure 18C:
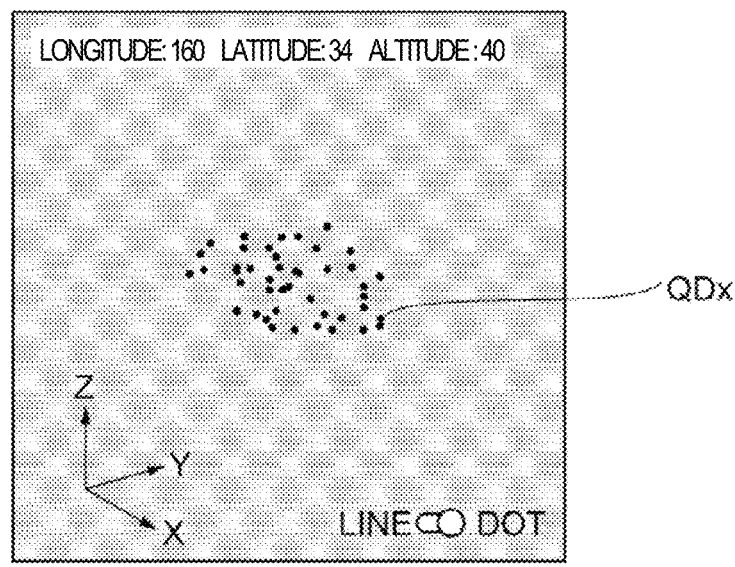
FIG. 18C illustrates a modification of the twelfth display example.

Next, referring to FIGS. 18A, 18B, and 18C, a twelfth display example of an image displayed on the display part 16 in relation to the bridge 50 (see FIG. 6) will be described. FIGS. 18A and 18B illustrate the twelfth display example relating to displacement of the bridge. FIG. 18C illustrates a modification of the twelfth display example.

The images serving as the twelfth display example, illustrated in FIGS. 18A, 18B, and 18C, display the state of displacement of a selected bridge serving as the bridge 50. On each of these images, a sensor (an acceleration detector 100) can be specified by touching a mark P1 on the left-side screen, for example. A movement locus of the specified sensor (acceleration detector 100) within a predetermined period is rendered on the right-side screen in the form of a movement line diagram QLx. The movement line diagram QLx shows displacement in the X axis direction as a representative example, but the display may be switched to the Y axis direction or the Z axis direction. Note that a switch for selecting either the movement line diagram QLx or a movement dot diagram QDx such as that illustrated in FIG. 18C as the display of the movement locus of the sensor (acceleration detector 100) may be provided on the right-side screen, and a longitude, a latitude, an altitude, and so on may be displayed as information indicating the installment position of the bridge 50. Further, on this image, by scrolling the screen, the occurrence frequency of the displacement amount can be displayed in the form of a histogram such as that as illustrated in FIG. 18B. The histogram illustrated in FIG. 18B can be displayed by switching the screen instead of scrolling the screen.

1.6.13. Thirteenth Display Example

Figure 19:
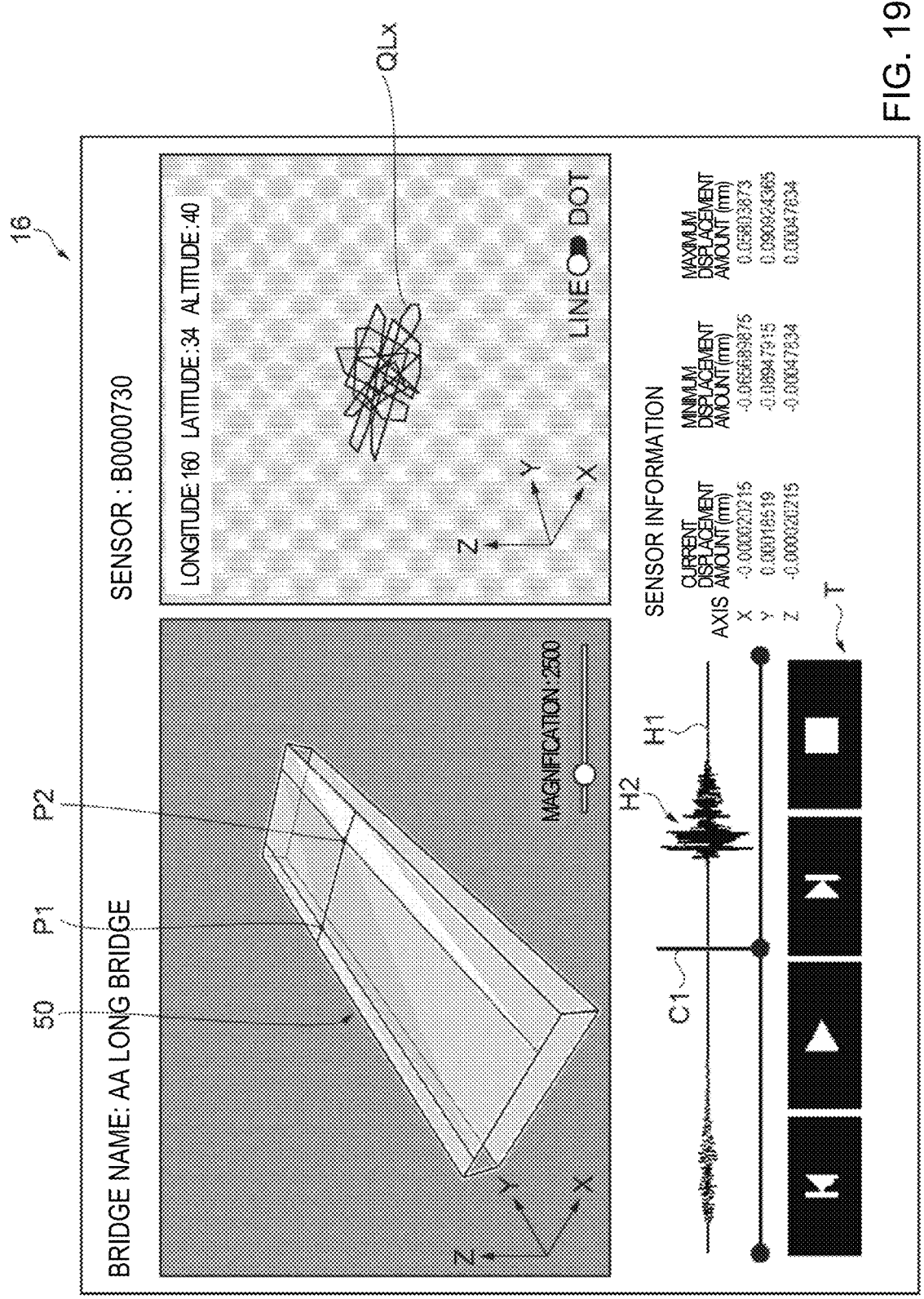
FIG. 19 illustrates a thirteenth display example relating to displacement of the bridge.

Next, referring to FIG. 19, a thirteenth display example of an image displayed on the display part 16 in relation to the bridge 50 (see FIG. 6) will be described. FIG. 19 illustrates the thirteenth display example relating to displacement of the bridge.

The image serving as the thirteenth display example, illustrated in FIG. 19, displays the displacement situation, within a predetermined period, of a sensor (an acceleration detector 100) specified by touching the mark P1 on the left-side screen illustrated in FIG. 18A on an image on which the movement locus of the sensor is rendered on the right-side screen in the form of the movement line diagram QLx, and also displays the displacement situation of the sensor (the acceleration detector 100) within a partial period of the predetermined period in the form of a waveform diagram H1. By moving a scroll line C1 using command buttons T, the scroll line C1 can be positioned on a part having a large waveform H2, for example, and as a result, numerical value information indicating the specific displacement amount of the sensor (the acceleration detector 100) in this position can be displayed as the "sensor information".

With the structure monitoring system 1 and the display device 10 according to the first embodiment, described above, image information from which the displacement of the bridge 50 serving as the structure can be visually recognized is displayed on the display part 16 provided in the display device 10 based on the displacement amounts of respective sites of the bridge 50, which are calculated based on the output signals output respectively by the plurality of acceleration detectors 100 serving as physical quantity sensors, and as a result, the manager (the user) can objectively recognize and determine the displacement state of the bridge 50, such as displacement magnitudes and displacement positions, for example, by means of visual recognition.

1.7. Head-Mounted Display (HMD)

Figure 20A:
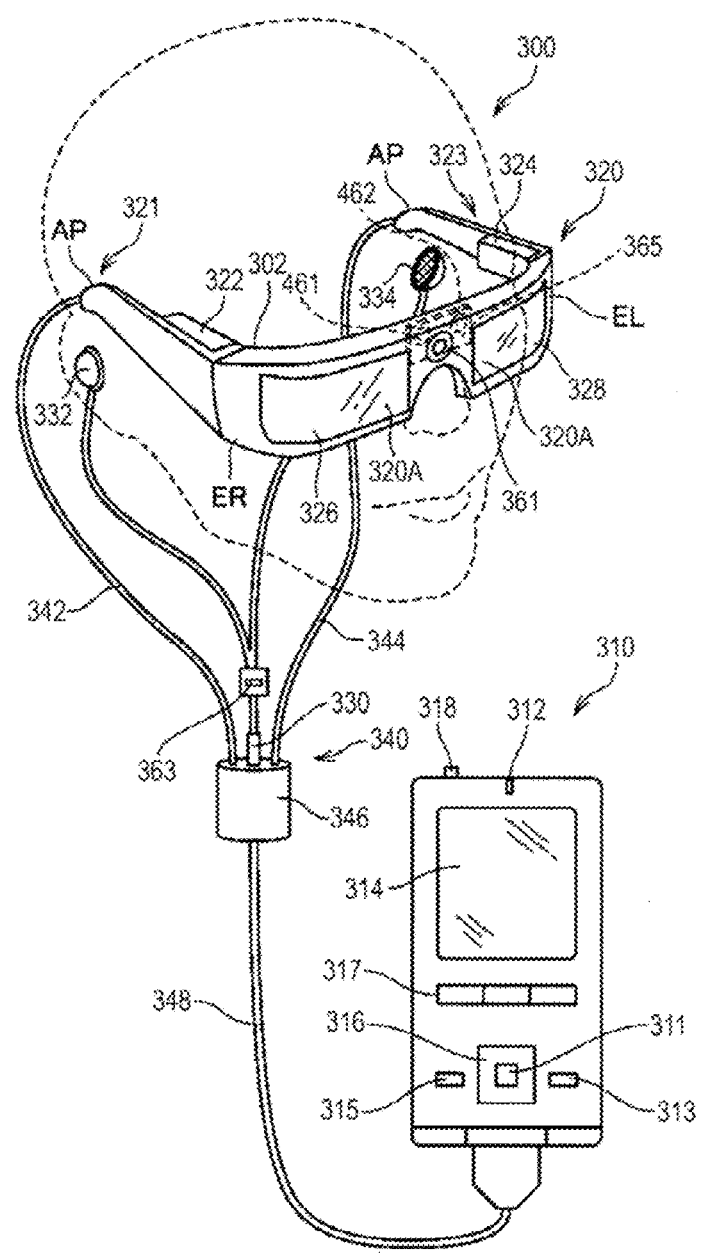
FIG. 20A illustrates an example configuration of a head-mounted display (HMD) device serving as a display part.
Figure 20B:
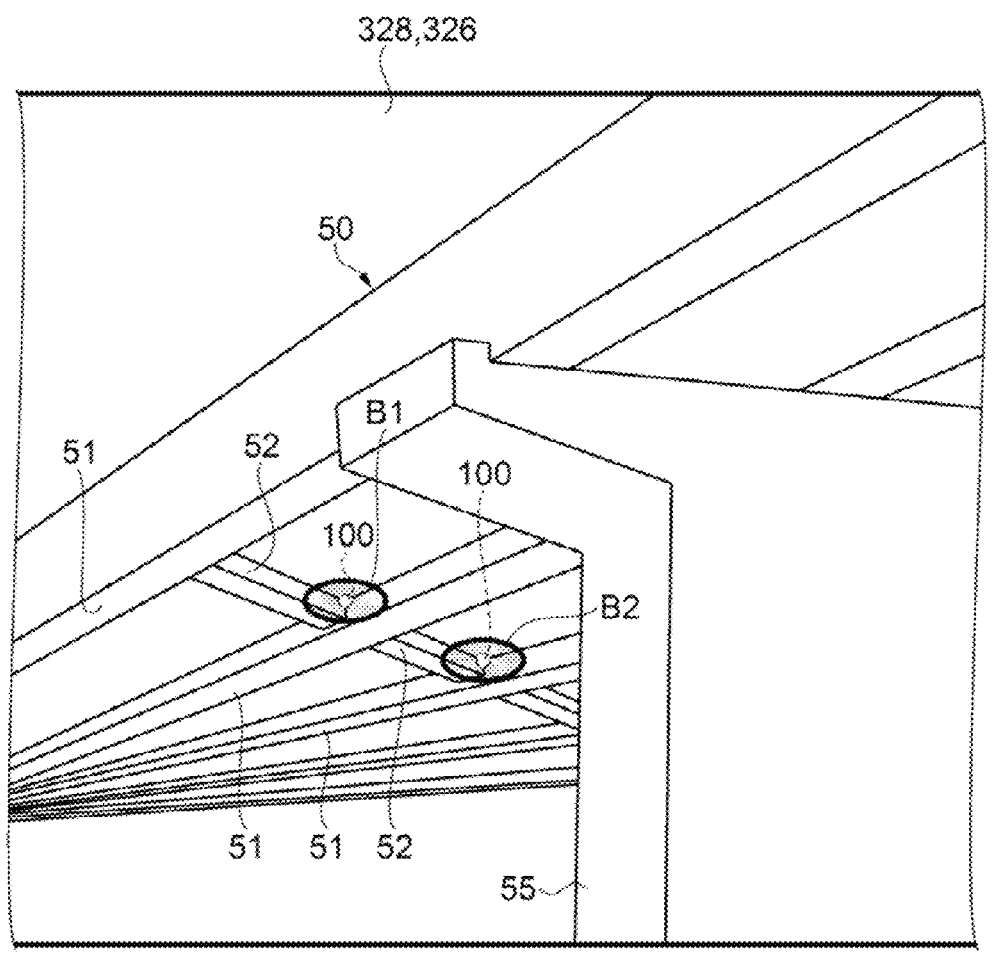
FIG. 20B illustrates an example of a display on the head-mounted display (HMD) device.

An example of a head-mounted display device that can be used as the display device will now be described using FIGS. 20A and 20B. FIG. 20A illustrates an example configuration of a head-mounted display (HMD) device. FIG. 20B illustrates an example of a display on the head-mounted display (HMD) device.

As illustrated in FIG. 20A, the head-mounted display device 300 includes an image display part 320 serving as a display part that allows a user to view a virtual image while mounted on the head of the user, and a control device 310 for controlling the image display part 320. The control device 310 also functions as a controller with which the user operates the head-mounted display device 300. The image display part 320 is a mounted body that is mounted on the head of the user, and in the first embodiment, includes a frame 302 (a main body) formed in the shape of a pair of glasses.

Note that the information terminal 80 illustrated in FIG. 3B can be used as the control device 310. In this case, an operation part (not shown) of the information terminal 80 functions as an enter key, a display switching key, a tracking pad, a brightness switching key, direction keys, a menu key, and so on. Further, FIG. 20A illustrates an example in which the image display part 320 and the control device 310 are connected via a connector 340 (a main body cord 348, a right cord 342, and a left cord 344), but the image display part 320 and the control device 310 may also be connected by wireless communication.

The frame 302 includes a right holding portion 321 and a left holding portion 323. The right holding portion 321 is a member provided to extend from an end portion ER serving as a second end of a right optical image display part 326 to a position corresponding to a head side portion of the user wearing the image display part 320. Similarly, the left holding portion 323 is a member provided to extend from an end portion EL serving as a second end of a left optical image display part 328 to a position corresponding to a head side portion of the user wearing the image display part 320. The right holding portion 321 contacts the right ear or the vicinity thereof on the head of the user, and the left holding portion 323 contacts the left ear of the user or the vicinity thereof. Thus, the image display part 320 is held on the head of the user. The right holding portion 321 and the left holding portion 323 hold the image display part 320 on the head of the user in a similar manner to the temples of a pair of glasses.

In the first embodiment, the glasses-shaped frame 302 is cited as an example of the main body. However, the shape of the main body is not limited to the shape of a pair of glasses and may be any shape that can be worn securely on the head of the user. A shape that can be worn so as to extend across and in front of the left and right eyes of the user is even more preferable. For example, instead of the glasses shape described here, a shape resembling a pair of snow goggles that cover the upper portion of the head of the user or a shape resembling a pair of binoculars disposed in front of the left and right eyes of the user may be employed.

The frame 302 is provided with a right display driver 322, a left display driver 324, the right optical image display part 326, the left optical image display part 328, and a microphone 363. The right display driver 322 and the left display driver 324 are disposed on opposing sides of the head of the user when the user wears the image display part 320. The right optical image display part 326 and the left optical image display part 328 are positioned respectively in front of the right and left eyes of the user when the user wears the image display part 320. A first end of the right optical image display part 326 and a first end of the left optical image display part 328 are coupled to each other in a position corresponding to the gap between the brows of the user when the user wears the image display part 320.

With the head-mounted display device 300, as illustrated in FIG. 20B, marks B1 and B2 corresponding to the positions in which the acceleration detectors 100 are attached to the bridge 50 are displayed on the right optical image display part 326 and the left optical image display part 328 so as to be superimposed on an actual image of the bridge 50, for example.

Display of the marks B1 and B2 can be switched in response to movement of the sightline of the user (the manager). For example, when the sightline of the user (the manager) moves from left to right in the figure, first, the mark B1 is displayed on the right optical image display part 326 and the left optical image display part 328 in accordance with the position of the acceleration detector 100 positioned in front of the sightline. Then, when the sightline moves to the position of the next acceleration detector 100, the mark B2 is displayed in accordance with the position of the next acceleration detector 100. Note that at this time, display of the mark B1 may either be halted or continued.

By employing the head-mounted display device 300 as the display device in this manner, an actual image of the bridge 50 and the virtual images of the marks B1 and B2 can be displayed in superimposed fashion. Moreover, by switching the display in response to movement of the sightline of the user (the manager), the user can selectively check the state in a position to be checked.

2. Second Embodiment

2.1. Structure Monitoring System

Figure 21:
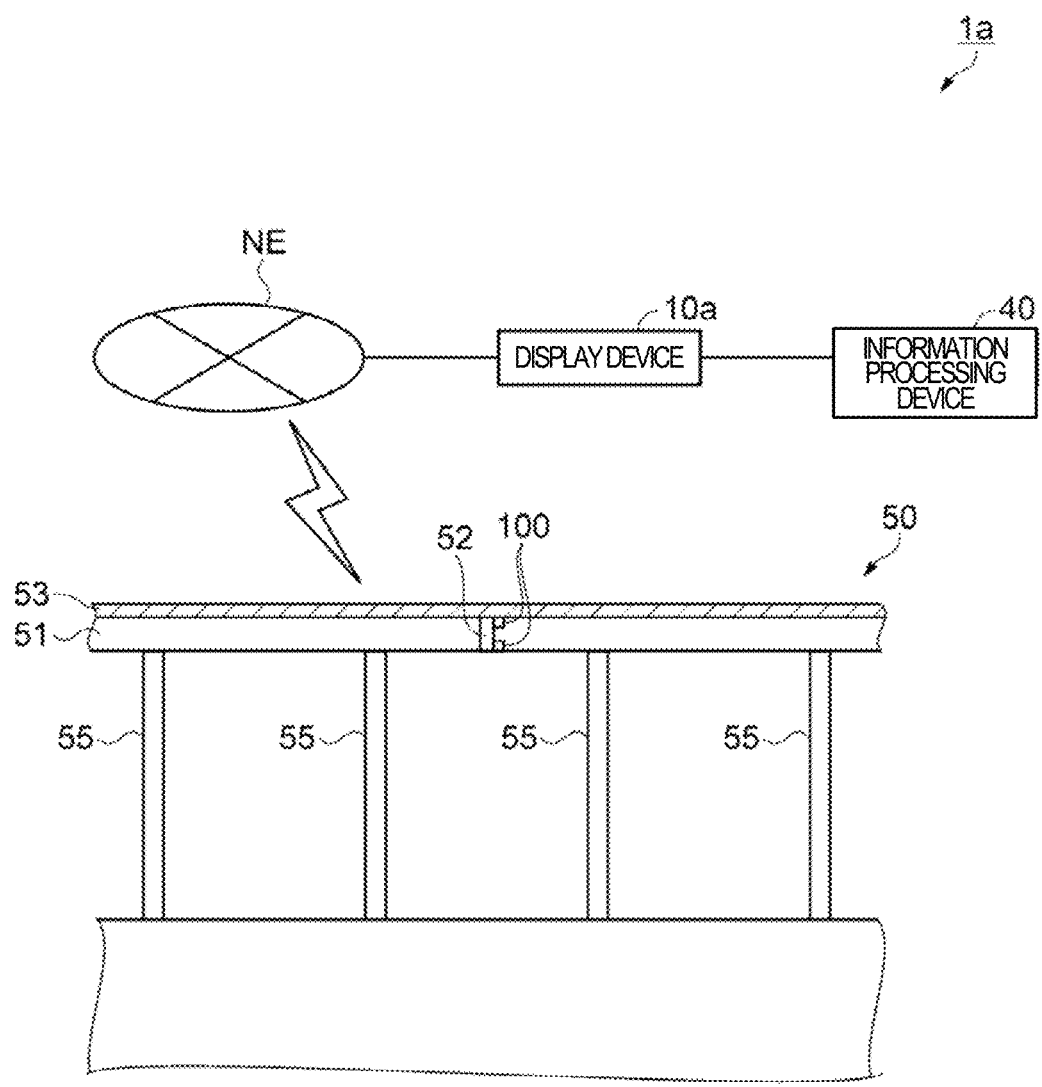
FIG. 21 is a schematic view illustrating a configuration of a structure monitoring system according to a second embodiment.
Figure 22:
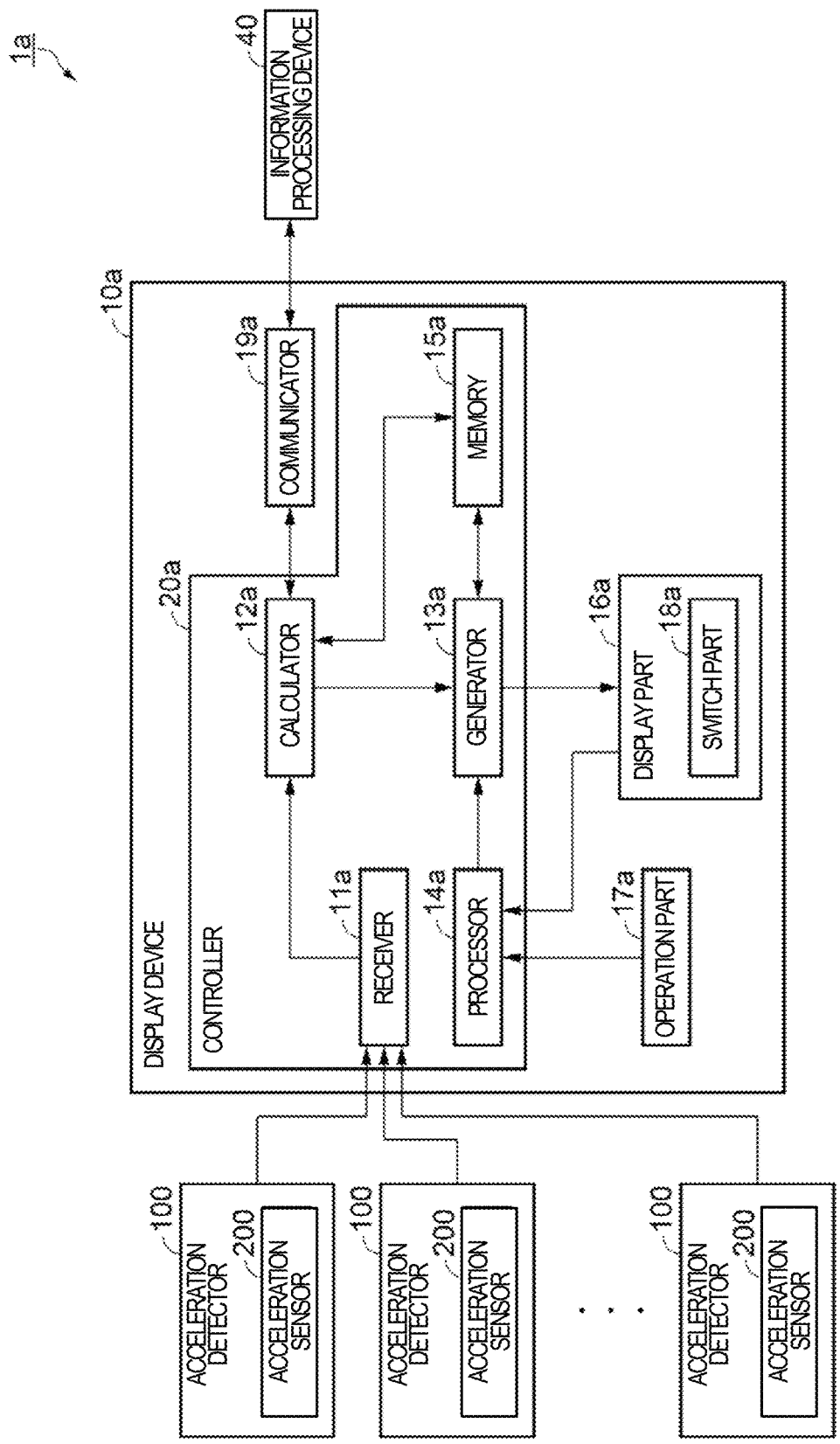
FIG. 22 is a function block diagram illustrating the configuration of the structure monitoring system according to the second embodiment.

First, a structure monitoring system 1a according to a second embodiment of the invention will be described with reference to FIGS. 21 and 22. FIG. 21 is a schematic view illustrating a configuration of the structure monitoring system according to the second embodiment. FIG. 22 is a function block diagram illustrating the configuration of the structure monitoring system according to the second embodiment.

Similarly to the first embodiment, the structure monitoring system 1a according to the second embodiment, illustrated in FIGS. 21 and 22, has a function for monitoring the state of a structure such as the bridge 50 or a building by displaying the state of displacement of the structure on a display part 16a in the form of image information based on displacement information about the structure, the displacement information being detected by the acceleration detectors 100 that serve as physical quantity sensors and are disposed on the structure. Note that in the second embodiment, an example in which the state of the bridge 50 is monitored as the structure will be described.

As illustrated in FIGS. 21 and 22, the structure monitoring system 1a is configured to include the acceleration detectors 100, which are constituted by a plurality of physical quantity sensors disposed on the bridge 50 that serves as an example of the structure, and a display device 10a that displays visually recognizable image information based on the displacement amount of the main girder 51 of the bridge 50, which is calculated based on the output signals output respectively from the plurality of acceleration detectors 100. Note that the plurality of acceleration detectors 100 are disposed on either the main girder 51 or the crossbeam 52 located between one pier 55 and another pier 55 of the bridge 50. Furthermore, in this embodiment, an example in which eight acceleration detectors 100 (see FIG. 6) are disposed will be described.

The acceleration detectors 100 serving as physical quantity sensors are capable of detecting acceleration in respective axial directions of three mutually orthogonal axes. The acceleration detectors 100 are fixed to predetermined positions on the bridge 50 so that output signals from the respective acceleration detectors 100 can be output to the display device 10a. Note that since the acceleration detectors 100 are configured similarly to the first embodiment, further description thereof has been omitted.

2.2. Display Device

The display device 10a includes a controller 20a that calculates the displacement amount of the main girder 51 of the bridge 50 based on the output signals output respectively from the plurality of acceleration detectors 100 and outputs the displacement amount in the form of visually recognizable image information, an operation part 17a that issues instructions relating to display content and so on to the controller 20a, the display part 16a, which displays the image information relating to the displacement amount of the main girder 51 of the bridge 50, calculated by the controller 20a, and a communicator 19a that transmits data and so on relating to the displacement amount of the main girder 51 of the bridge 50, calculated by the controller 20a, to the information processing device 40, which is constituted by a server or the like, for example.

The controller 20a includes a receiver Ila, a calculator 12a, a generator 13a, a processor 14a, and a memory 15a. The respective function units of the controller 20a denote functional configurations realized by cooperation between hardware such as a CPU and a RAM, not shown in the figures, and software recorded in the memory 15a, and there are no particular limitations on the specific form thereof.

Accordingly, hardware corresponding individually to the respective function units does not necessarily have to be packaged in the device, and the functions of a plurality of function units may be realized by having a single processor execute a program.

The controller 20a is constituted by a multifunctional portable terminal such as a personal computer or a tablet, a high-performance portable telephone such as a smartphone, or the like. The controller 20a receives information output from the acceleration detectors 100, such as the displacement amount of the main girder 51 of the bridge 50, processes the information as required, and displays the processed information using the display part 16a in the form of image information that can be visually recognized by the user. Note that the controller 20a may receive information from a plurality of acceleration detectors 100 disposed on one or each of a plurality of structures and then process and display the received plurality of information in a multifaceted manner.

Further, the processing executed by the respective units of the structure monitoring system 1a according to the second embodiment can be realized by a program recorded in the memory 15a. More specifically, a method according to the second embodiment can be applied to a program that causes a computer to execute processing that includes procedures including calculating the displacement amount of the bridge 50 serving as the structure based on the output signals output respectively from the plurality of acceleration detectors 100 disposed on the bridge 50, generating image information from which the displacement of the bridge 50 can be visually recognized based on the displacement amount of the bridge 50, and displaying the image information on the display part 16a of the display device 10a.

The receiver 11a receives the output signals output respectively from the plurality of acceleration detectors 100, which in this embodiment are constituted by eight acceleration detectors 100, and outputs the received output signals to the calculator 12a.

The calculator 12a calculates the displacement amount of the main girder 51 of the bridge 50 based on the output signals received by the receiver 11a, and outputs the calculated displacement amount to the generator 13a and the communicator 19a. Note that the calculator 12a can obtain information acquired by the information processing device 40 and so on from the communicator 19a.

The generator 13a generates image information from which the state of displacement of the bridge 50 can be visually recognized based on the displacement amount of the main girder 51 of the bridge 50, calculated by the calculator 12a, and in response to an instruction from the processor 14a, outputs the generated image information to the display part 16a.

The processor 14a executes various processing in accordance with a program stored in the memory 15a and various commands input by the user through the operation part 17a and a switch part 18a of the display part 16a. The processor 14a controls the image information output by the generator 13a based on the existence of a screen switching instruction input from the operation part 17a or the switch part 18a of the display part 16a, and issues an instruction relating to the image information to be output to the display part 16a, or in other words an instruction relating to the image content to be displayed on the display part 16a. The processor 14a includes a processor that operates based on a program recorded in the memory 15a. The processor may be configured such that functions of respective units are realized by either individual or integrated hardware, for example. The processor may be a central processor (CPU), for example, but the processor is not limited to a CPU, and various types of processors, such as a graphics processor (GPU) or a digital signal processor (DSP), may be used instead. The processor may also be a hardware circuit constituted by an ASIC.

A nonvolatile recording medium such as a flash memory or a hard disk is envisaged as the memory 15a. For example, the memory 15a may be a semiconductor memory such as a static random-access memory (SRAM) or a dynamic random-access memory (DRAM), a register, a magnetic storage device such as a hard disk device, or an optical storage device such as an optical disk. The program used by the controller 20a to control the operations of respective functions (for example, a program relating to monitoring of a structure, to be described below), the displacement amount calculated by the calculator 12a, and the image information generated by the generator 13a are recorded in the memory 15a.

The output signals output respectively from the acceleration detectors 100 can be recorded in the memory 15a in time-synchronized fashion. Thus, the calculator 12a calculates the amount of displacement in the state of the bridge 50 at an earlier time than the current time based on the time-synchronized output signals recorded in the memory 15a. Visually recognizable image information is generated and displayed on the display part 16a in accordance with the displacement amount calculated in time series in this manner, and as a result, the user can objectively recognize and determine the state of the structure in time series.

Note that the memory 15a stores a computer-readable program that functions as a recording medium and relates to monitoring of a structure, and the functions of the respective units of the structure monitoring system 1a are realized by having the processor 14a execute this program. More specifically, a program that causes a computer to execute processing that includes procedures including calculating the displacement amount of the bridge 50 serving as the structure based on the output signals output respectively from the plurality of acceleration detectors 100 disposed on the bridge 50, generating image information from which the displacement of the bridge 50 can be visually recognized based on the displacement amount of the bridge 50, and displaying the image information is recorded in the memory 15a.

The operation part 17a is constituted by buttons, keys, a microphone, a touch panel, a voice recognition function (using a microphone, not shown in the figures), an action detection function (using an acceleration sensor or the like), and so on, for example, and is capable of executing processing for converting instructions from the user into appropriate signals and transmitting the signals to the processor 14a.

The display part 16a is capable of displaying the displacement amount of the main girder 51 of the bridge 50, which is calculated and generated by the controller 20a based on the output signals output respectively from the plurality of acceleration detectors 100 and then output from the controller 20a, in the form of visually recognizable image information. The display part 16a includes the switch part 18a, which is capable of switching the display content. Note that the display method and display examples are similar to the first embodiment, described above, and therefore further description thereof has been omitted.

The display part 16a is constituted by a liquid crystal display (LCD), an organic electroluminescence (EL) display, an electrophoretic display (EPD), a touch panel display, or the like, for example. The display part 16a displays the displacement amount of the main girder 51 of the bridge 50 in the form of a visually recognizable image based on the image information output from the generator 13a in response to an instruction from the controller 20a.

The switch part 18a is constituted by the operation part 21 (see FIG. 8), tags on a touch panel (see FIG. 8), or the like, for example, and is capable of executing processing for converting an instruction from the user into an appropriate signal and transmitting the signal to the processor 14a. By operating the operation part 21 or touching the tags on the touch panel or the like, the user can perform switches so as to move the display screen on the display part 16a to the next screen or return the display screen to the previous screen and issue display instructions such as selecting the display content.

The communicator 19a is capable of transmitting various information output from the controller 20a to the information processing device 40 through communication and receiving various information output from the information processing device 40 through communication. The communicator 19a is configured to include a transceiver conforming to a short-range wireless communication standard such as Bluetooth (registered trademark) (including Bluetooth Low Energy (BTLE)), Wi-Fi (registered trademark) (Wi-Fi: Wireless Fidelity), Zigbee (registered trademark), near field communication (NFC), or ANT+(registered trademark), for example.

With the display device 10a, the state of displacement of the bridge 50 serving as the structure is displayed on the display part 16a in the form of visually recognizable image information based on the displacement amount of the bridge 50, which is calculated based on the output signals output respectively from the plurality of acceleration detectors 100, and therefore the manager (the user) can objectively recognize and determine the state of the bridge 50 by means of visual recognition.

With the structure monitoring system 1a and the display device 10a according to the second embodiment, described above, image information from which the displacement state, such as the displacement magnitude and the displacement position, for example, of the bridge 50 serving as the structure can be visually recognized is displayed on the display part 16a provided in the display device 10a based on the displacement amounts of respective sites of the bridge 50, which are calculated based on the output signals output respectively by the plurality of acceleration detectors 100 serving as physical quantity sensors, and as a result, the manager (the user) can objectively recognize and determine the state of the bridge 50 by means of visual recognition.

Matter derived from the above embodiments will be described below.

A display device according to an embodiment of the invention displays displacement of a structure on a display part in the form of image information that is visually recognizable, based on a displacement amount of the structure, the displacement amount having been calculated based on an output signal output from a physical quantity sensor provided on the structure.

According to this display device, image information that enables to visually recognize the displacement of the structure can be displayed on the display part based on the displacement amount of the structure, which is calculated based on the output signal output from the physical quantity sensor. As a result, the manager (the user) can objectively recognize and determine the state of displacement of the structure by means of visual recognition.

In the display device described above, the image information may be changed based on change in the displacement amount, and the changed image information may be displayed by using at least one of color, shading, lines, dots, circles, numerical values, symbols, loci, graphs, histograms, and waveforms.

According to this display device, the image information, having been changed based on change in the displacement amount of the structure, is displayed by using at least one of color, shading, lines, dots, circles, numerical values, symbols, loci, graphs, histograms, and waveforms, and therefore the manager (the user) can easily recognize the state of the structure. Here, the lines include the colors of the lines, the types of the lines, the thicknesses of the lines, the lengths of the lines, and so on, while the dots, circles, and symbols include the colors, shapes, sizes, and so on thereof.

In the display device described above, the displacement amount of the structure may be a relative value of the displacement amount calculated based on the output signal.

According to this display device, displacement amounts of respective sites of the structure on which the physical quantity sensor is provided are indicated by relative values of the calculated displacement amount output from the physical quantity sensor, and as a result, the manager (the user) can easily recognize comparisons between displacement magnitudes in different sites of the structure.

In the display device described above, a model image relating to the structure may be displayed, and the image information may be displayed either so as to be superimposed on the model image or side by side with the model image.

According to this display device, the image information is displayed either so as to be superimposed on a model image corresponding to the structure or side by side with the model image, and as a result, the manager (the user) can recognize the image information relating to each of the respective sites of the structure at a single glance.

In the display device described above, the physical quantity sensor may be disposed in a plurality, and the image information may be a line display image including a plurality of line segments linking adjacent physical quantity sensors among the plurality of physical quantity sensors.

According to this display device, displacement of and the displacement amount of the structure can be recognized visually from variation in the inclines of the line segments linking the adjacent physical quantity sensors or variation in the lengths and orientations of the line segments. As a result, the manager (the user) can recognize the state of the structure more easily.

In the display device described above, the display angle of the line display image may be changed by operating a first tag provided on the display part.

According to this display device, by operating the first tag, the angle of the line display image, or in other words the direction in which the manager (the user) views the display, can be varied, and as a result, the manager (the user) can recognize the state of the structure more easily.

The display device described above may include a memory, and the output signal may be recorded in the memory together with time information.

According to this display device, the state of the structure at an earlier time than the current time can be learned based on the output signal recorded in the memory and synchronized with the time information, and as a result, the manager (the user) can objectively recognize and determine the state of the structure in time series.

In the display device described above, the image information corresponding to a selected time may be displayed by operating a second tag displayed on the display part and used to select a time.

According to this display device, image information indicating the state of the structure at a selected time can easily be displayed by operating the second tag used to select a time.

In the display device described above, information about overload may be displayed on the display part after determining that a preset overload reference value has been exceeded based on the weight of a vehicle, the weight of the vehicle having been measured by a weight measurement device provided on the structure.

According to this display device, information about an overload is displayed on the display part in addition to the image information showing the state of the structure, and therefore the manager (the user) can check both the state of the structure and the information about the overload at a single glance.

A display method for a structure according to an embodiment of the invention includes calculating a displacement amount of the structure based on an output signal output from a physical quantity sensor provided on the structure, generating image information that enables to visually recognize the displacement of the structure, based on the calculated displacement amount of the structure, and displaying the generated image information.

According to this display method, image information that enables to visually recognize the displacement of the structure is generated based on the displacement amount of the structure, which is calculated based on the output signal output from the physical quantity sensor, whereupon the image information is displayed, and therefore the manager (the user) can objectively recognize and determine the state of the structure by means of visual recognition.

In the step of generating the image information in the display method described above, image information that is changed based on change in the displacement amount may be generated by using at least one of color, shading, lines, dots, circles, numerical values, symbols, loci, graphs, histograms, and waveforms.

According to this display method, in the step of generating the image information, the image information, having been changed based on change in the displacement amount of the structure, is displayed by using at least one of color, shading, lines, dots, circles, numerical values, symbols, loci, graphs, histograms, and waveforms, and therefore the information manager (the user) can easily recognize the state of the structure from the displayed image.

A program according to an embodiment of the invention causes a computer to execute calculating a displacement amount of a structure based on an output signal output from a physical quantity sensor provided on the structure, generating image information that enables to visually recognize displacement of the structure, based on the displacement amount of the structure, and displaying the image information.

With this program, it is possible to provide a program for causing a computer to execute procedures for calculating the displacement amount of the structure based on the output signal output from the physical quantity sensor provided on the structure, generating image information that enables to visually recognize the displacement of the structure, based on the calculated displacement amount of the structure, and displaying the image information.

A recording medium according to an embodiment of the invention stores a program that causes a computer to execute calculating a displacement amount of a structure based on an output signal output from a physical quantity sensor provided on the structure, generating image information that enables to visually recognize displacement of the structure, based on the displacement amount of the structure, and displaying the image information.

With this recording medium, it is possible to provide a recording medium that stores a program for causing a computer to execute procedures for calculating the displacement amount of the structure based on the output signal output from the physical quantity sensor provided on the structure, generating image information that enables to visually recognize the displacement of the structure, based on the calculated displacement amount of the structure, and displaying the image information.

A structure monitoring system according to an embodiment of the invention includes a physical quantity sensor provided on a structure, a calculator that calculates a displacement amount of the structure based on an output signal output from the physical quantity sensor, a generator that generates image information that enables to visually recognize displacement of the structure, based on the displacement amount of the structure, and the display device according to any one of the above embodiments that displays the image information.

With this structure monitoring system, it is possible to provide a structure monitoring system which, by including a physical quantity sensor provided on a structure, a calculator that calculates a displacement amount of the structure based on an output signal output from the physical quantity sensor, a generator that generates image information that enables visually recognize the displacement of the structure based on the displacement amount of the structure, and a display device having a display part that displays the image information, allows the manager (the user) to objectively recognize and determine the state of displacement of the structure by means of visual recognition.

A structure monitoring system according to an embodiment of the invention includes a physical quantity sensor provided on a structure and a display device for displaying displacement of the structure in the form of image information that is visually recognizable, based on a displacement amount of the structure, the displaement amount having been calculated based on an output signal output from the physical quantity sensor, wherein the display device includes a receiver that receives the output signal output from the physical quantity sensor, a calculator that calculates the displacement amount of the structure based on the received output signal, a generator that generates image information that enables to visually recognize the displacement of the structure based on the displacement amount of the structure, and a display part that displays the image information.

With this structure monitoring system, it is possible to provide a structure monitoring system which, by including a physical quantity sensor provided on a structure, a receiver for receiving the output signal output from the physical quantity sensor, a calculator for calculating the displacement amount of the structure based on the received output signal, a generator for generating image information from which the displacement of the structure can be visually recognized based on the displacement amount of the structure, and a display part for displaying the image information, allows the manager (the user) to objectively recognize and determine the state of displacement of the structure by means of visual recognition.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A display device comprising:
a display configured to display displacement of a bridge over which a vehicle travels as image information that is visually recognizable, based on displacement amounts of the bridge, wherein
the image information includes (i) a displayed image of the bridge and (ii) visual indicators of the displacement amounts at respective structural locations on the displayed image of the bridge, and
the display device is configured to calculate the displacement amount based on time-synchronized output signals received respectively from a plurality of acceleration detectors provided on the bridge, wherein, on the display device, the visual indicators are overlaid on the respective structural locations of the displayed image of the bridge and indicate a magnitude of the displacement amounts at the respective structural locations,
wherein the display device is configured to calculate respective magnitudes of the displacement amounts, and wherein the visual indicators separately indicate the respective magnitudes of the displacement amounts at the respective structural locations.

2. The display device according to claim 1,
wherein the image information is changed based on a change in the displacement amounts, and
wherein the changed image information is displayed by using at least one of color, shading, lines, dots, circles, numerical values, symbols, loci, graphs, histograms, and waveforms.

3. The display device according to claim 1,
wherein the displacement amounts of the bridge are relative values of the displacement amounts as calculated based on the output signals.

4. The display device according to claim 1,
wherein information about overload is displayed on the display after determining that a preset overload reference value has been exceeded based on a weight of the vehicle, the weight of the vehicle having been measured by a weight measurement device provided on the bridge.

5. A structure monitoring system comprising the display device of claim 1 and further comprising:
the plurality of acceleration detectors;
a calculator that calculates the displacement amounts of the bridge based on the time-synchronized output signals received respectively from the plurality of acceleration detectors; and
a generator that generates the image information based on the calculated displacement amounts of the bridge.

6. The display device according to claim 1, comprising a memory,
wherein the output signals are recorded in the memory.

7. The display device according to claim 6,
wherein the image information corresponding to a selected time is displayed by operating a second tag displayed on the display and used to select a time.

8. The display device according to claim 1,
wherein a model image relating to the bridge is displayed, and
wherein the image information is displayed either so as to be superimposed on the model image or side by side with the model image.

9. The display device according to claim 8,
wherein the image information is a line display image including a plurality of line segments linking adjacent acceleration detectors among the plurality of acceleration detectors.

10. The display device according to claim 9,
wherein a display angle of the line display image is changed by operating a first tag provided on the display.

11. A display method comprising:
calculating displacement amounts of a bridge over which a vehicle travels based on time-synchronized output signals received respectively from a plurality of acceleration detectors provided on the bridge;
generating image information that visually represents the displacement of the bridge, based on the calculated displacement amounts of the bridge;
displaying the generated image information, wherein
the image information includes (i) an image of the bridge and (ii) visual indicators of the displacement amounts that are overlaid on respective structural locations on the image of the bridge and indicate a magnitude of the displacement amounts at the respective structural locations; and
calculating respective magnitudes of the displacement amounts, wherein the visual indicators separately indicate the respective magnitudes of the displacement amounts at the respective structural locations.

12. The display method according to claim 11,
wherein, in the step of generating the image information, image information that is changed based on change in the displacement amounts is generated by using at least one of color, shading, lines, dots, circles, numerical values, symbols, loci, graphs, histograms, and waveforms.

* * * * *